US010896340B2

(12) United States Patent
Johnson et al.

(10) Patent No.: US 10,896,340 B2
(45) Date of Patent: Jan. 19, 2021

(54) ENCODING DATA IN SYMBOLS DISPOSED ON AN OPTICALLY ACTIVE ARTICLE

(71) Applicant: 3M INNOVATIVE PROPERTIES COMPANY, St. Paul, MN (US)

(72) Inventors: Justin M. Johnson, Hudson, WI (US); James W. Howard, Circle Pines, MN (US); James B. Snyder, Minneapolis, MN (US); Thomas J. Dahlin, Ironwood, MI (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 260 days.

(21) Appl. No.: 15/754,155

(22) PCT Filed: Aug. 19, 2016

(86) PCT No.: PCT/US2016/047682
§ 371 (c)(1),
(2) Date: Feb. 21, 2018

(87) PCT Pub. No.: WO2017/034938
PCT Pub. Date: Mar. 2, 2017

(65) Prior Publication Data
US 2018/0253616 A1 Sep. 6, 2018

Related U.S. Application Data

(60) Provisional application No. 62/207,986, filed on Aug. 21, 2015, provisional application No. 62/316,747, filed on Apr. 1, 2016.

(51) Int. Cl.
*G06K 9/20* (2006.01)
*G06K 9/32* (2006.01)

(52) U.S. Cl.
CPC ......... *G06K 9/2018* (2013.01); *G06K 9/2036* (2013.01); *G06K 9/2063* (2013.01);
(Continued)

(58) Field of Classification Search
CPC .. G06K 9/2018; G06K 9/2063; G06K 9/2036; G06K 9/3216; G06K 9/3258; G06K 2209/15
See application file for complete search history.

(56) References Cited

U.S. PATENT DOCUMENTS 4,368,979 A 1/1983 Ruell
4,908,500 A 3/1990 Baumberger
(Continued)

FOREIGN PATENT DOCUMENTS

EP 0416742 3/1991
GB 2458701 9/2009
(Continued)

OTHER PUBLICATIONS

Bender, "Techniques for Data Hiding", IBM Systems Journal, 1996, vol. 35, Nos. 3&4, pp. 313-336.
(Continued)

*Primary Examiner* — Yon J Couso
(74) *Attorney, Agent, or Firm* — Michael Stern

(57) ABSTRACT

In some examples, a computing device receives an image of an optically active article that includes a set of one or more symbols of a symbol set, wherein at least one symbol of the set of one or more symbols comprises a set of encoding regions that are embedded with the symbol. In response to receiving the image, the computing device may determine that a particular image region of the image represents the at least one symbol. For encoding regions within the at least one symbol, the computing device may determine, based at least in part on the determination that the particular image
(Continued)

region of the image represents the at least one symbol, whether the one or more encoding regions are active or inactive. The computing device may perform, based at least in part on whether the one or more encoding regions are active or inactive, one or more operations.

20 Claims, 12 Drawing Sheets

(52) U.S. Cl.
CPC ......... *G06K 9/3216* (2013.01); *G06K 9/3258* (2013.01); *G06K 2209/15* (2013.01)

(56) References Cited

U.S. PATENT DOCUMENTS

| | | |
|---|---|---|
| 6,731,775 B1 | 5/2004 | Ancin |
| 6,832,728 B2 | 12/2004 | Kennedy |
| 7,387,393 B2 | 6/2008 | Reich |
| 8,194,914 B1 | 6/2012 | Skogg |
| 8,311,343 B2 | 11/2012 | Chung |
| 8,865,293 B2 | 10/2014 | Smithson |
| 9,002,066 B2 | 4/2015 | Kozitsky |
| 9,025,828 B2 | 5/2015 | Karel |
| 9,239,955 B2 | 1/2016 | Bhanu |
| 9,317,752 B2 | 4/2016 | Bulan |
| 9,953,210 B1* | 4/2018 | Rozploch ........... G06K 9/00838 |
| 2002/0030112 A1 | 3/2002 | Schreiber |
| 2003/0189500 A1 | 10/2003 | Lim |
| 2004/0089727 A1 | 5/2004 | Baharav |
| 2005/0267657 A1 | 12/2005 | Devdhar |
| 2010/0151213 A1 | 6/2010 | Smithson |
| 2010/0164219 A1 | 7/2010 | Jeacock |
| 2011/0084126 A1 | 4/2011 | Fleming |
| 2015/0060551 A1 | 3/2015 | Fleming |
| 2017/0177963 A1* | 6/2017 | Pavelka ................ G06K 9/2018 |
| 2017/0236019 A1* | 8/2017 | Watson ................ G06K 9/2018 |
| | | 382/105 |

FOREIGN PATENT DOCUMENTS

| | | |
|---|---|---|
| WO | WO 1991-10213 | 7/1991 |
| WO | WO 2007-139035 | 12/2007 |
| WO | WO 2011-044149 | 4/2011 |
| WO | WO 2013-149142 | 10/2013 |
| WO | WO 2015-148426 | 10/2015 |
| WO | WO 2017-034968 | 3/2017 |

OTHER PUBLICATIONS

International Search Report for PCT International Application No. PCT/US2016/047682, dated Jan. 25, 2017, 6 pages.

* cited by examiner

1=!
2=@
3=#
4=$
5=%
6=^
7=&
8=*
9=(
10=)
FIG. 5A
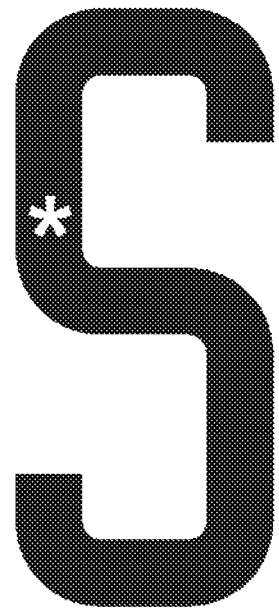
FIG. 5B
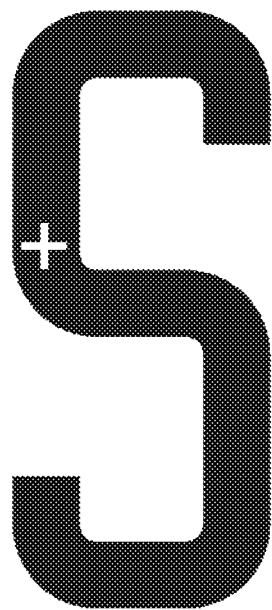
FIG. 5C
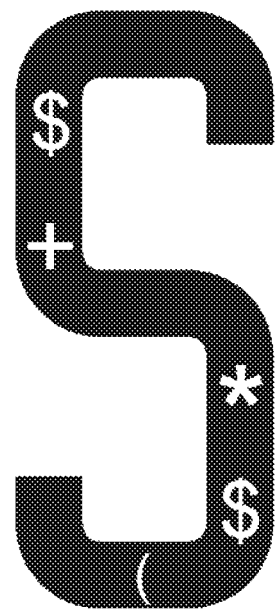
FIG. 5D

ENCODING DATA IN SYMBOLS DISPOSED ON AN OPTICALLY ACTIVE ARTICLE

CROSS REFERENCE TO RELATED APPLICATIONS

This application is a national stage filing under 35 U.S.C. 371 of PCT/US2016/047682, filed Aug. 19, 2016, which claims the benefit of Provisional Application Nos. 62/207986, filed Aug. 21, 2015 and 62/316747, filed Apr. 1, 2016, the disclosure of which is incorporated by reference in its/their entirety herein.

TECHNICAL FIELD

The present application relates generally to retroreflective articles and systems in which such retroreflective articles may be used.

BACKGROUND

Automatic Vehicle Recognition (AVR) or Automated License Plate Recognition (ALPR) may refer to the detection and recognition of a vehicle by an electronic system. Exemplary uses for AVR or ALPR include, for example, automatic tolling (e.g., electronic toll systems), traffic law enforcement (e.g., red light running systems, speed enforcement systems), searching for vehicles associated with crimes, access control systems, and facility access control. AVR systems in use today may include systems using RFID technology to read an RFID tag attached to a vehicle. ALPR systems may use cameras to capture images of license plates.

Some AVR systems use RFID, although not all vehicles may include RFID tags. Furthermore, some tag readers may have difficulty pinpointing the exact location of an unpowered RFID tag. As such, these tag readers may only detect the presence or absence of a tag in their field of sensitivity, rather than information included in the RFID tags. Some RFID tag readers may only operate at short range, function poorly in the presence of metal, and/or may be blocked by interference when many tagged objects are present.

ALPR systems use an image capture device to read information of a vehicle, such as a license plate number or other visual content of the license plate. In some instances, the information is attached to, printed on, or adjacent to a license plate. ALPR systems may be used in many environments, since almost all areas of the world require that vehicles have license plates with visually identifiable information thereon. However, image capture and recognition of license plate information for a vehicle may be complex. For example, the read accuracy from an ALPR system may be dependent on the quality of the captured image as assessed by the reader.

BRIEF DESCRIPTION OF DRAWINGS

FIG. 5A is a symbol set and FIGS. 5B-5D are corresponding conceptual diagrams of symbols that include encoding regions based on the symbol set that may be printed on an optically active article, in accordance with techniques of this disclosure.

As shown in FIG. 7A, symbol 700 includes two encoding regions, 702 and 704.

DETAILED DESCRIPTION

Techniques of this disclosure are directed to encoding data in symbols disposed on an optically active article. For instance, an optically active article may be a license plate that includes one or more symbols (e.g., characters or numbers) printed on the license plate. Techniques of the disclosure may include encoding regions embedded within or proximal to such symbols on the license plate. The encoding regions may indicate one or more values, such that a set of values may represent data. To process the data, techniques of the disclosure may include capturing an image of the symbols under a particular lighting condition, such that the values for the encoding regions are determinable by a computing device. Based on various characteristics of the encoding regions and values of the encoding regions as determined in the image, techniques of the disclosure may determine data encoded in the license plate. A computing device may use such data for additional processing (e.g., tolling, security, and the like).

Figure 1:
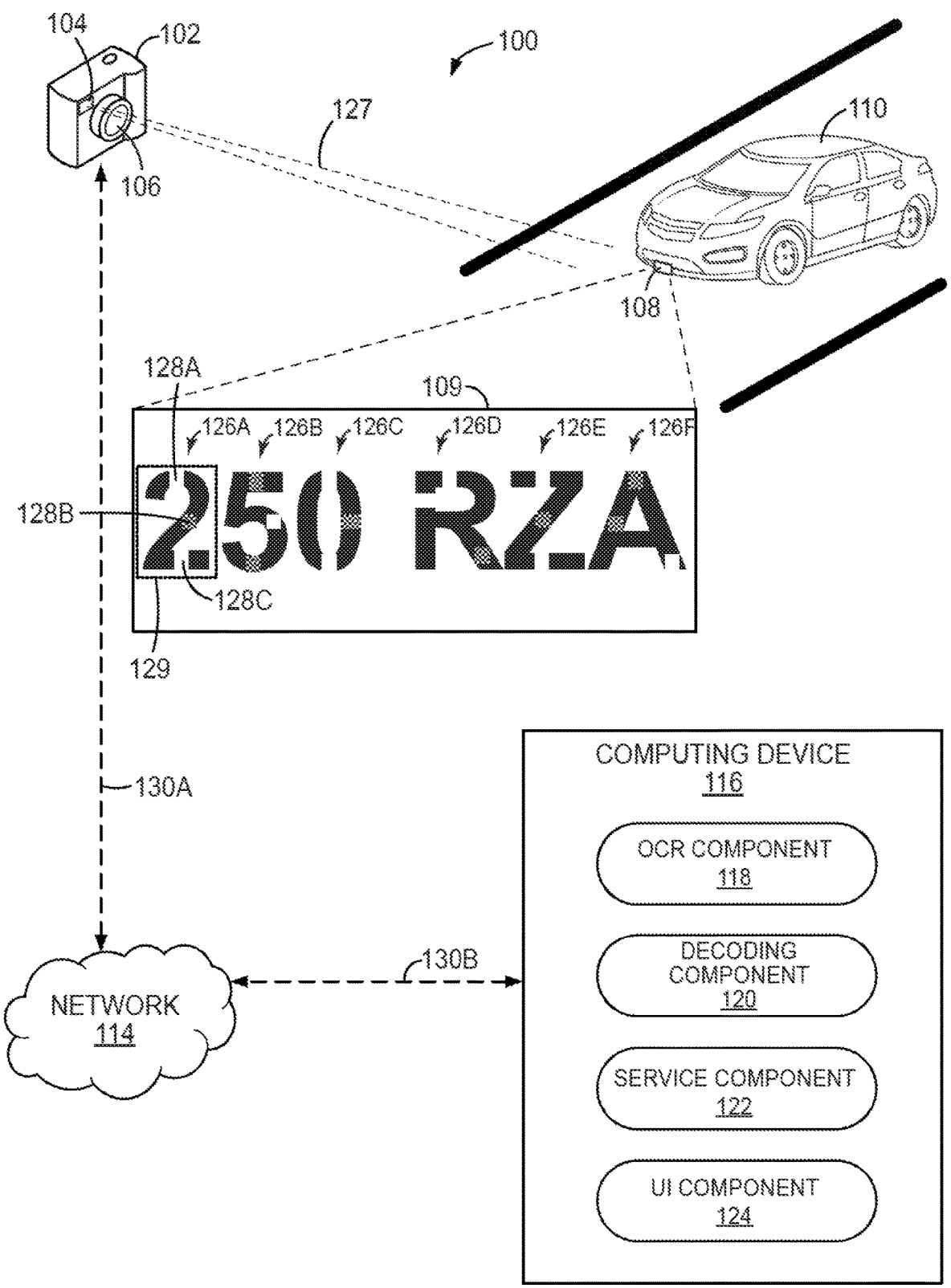
FIG. 1 is a block diagram illustrating an example system 100 for decoding information included in encoding regions of an optically active article in accordance with techniques of this disclosure.

FIG. 1 is a block diagram illustrating an example system 100 for decoding information included in encoding regions of an optically active article in accordance with techniques of this disclosure. As shown in FIG. 1, system 100 includes an image capture device 102. Image capture device 102 may include one or more image capture sensors 106 and one or more light sources 104. System 110 may also include one or more optically active articles as described in this disclosure, such as license plate 108. License plate 108 may be attached or otherwise associated with vehicle 110. In some examples, image capture device 102 is communicatively coupled to computing device 102 via network 102 using one or more communication links. In other examples, as described in this disclosure, image capture device 102 may be communicatively coupled to computing device 102 via one or more forms of direct communication without network 102, such as via a wired or wireless connection that does not require a network.

For example purposes in FIG. 1, optically active article 108 is illustrated as a license plate as attached to vehicle 110. Vehicle 110 may be an automobile, motorcycle, airplane, water vessel, military equipment, bicycle, train, or any other transportation vehicle. In other examples, optically active article 108 may be attached to, included or embedded in, or otherwise integrated or associated with objects including, but not limited to: a document, clothing, wearable equipment, a building, stationary equipment, or any other object. In some examples, optically active article 108 may not be a separate object attached to vehicle 110 but rather printed on vehicle 110 or other suitable object.

Optically active article 108 may include reflective, non-reflective, and/or retroreflective sheeting applied to a base surface. In some examples, an optically active article may be a retroreflective article. Information, such as but not limited to characters, images, and/or any other graphical content, may be printed, formed, or otherwise embodied on the retroreflective sheeting. The reflective, non-reflective, and/or retroreflective sheeting may be applied to the base surface using one or more techniques and/or materials including but not limited to: mechanical bonding, thermal bonding, chemical bonding, or any other suitable technique for attaching retroreflective sheeting to a base surface. A base surface may include any surface of an object (such as described above, e.g., an aluminum plate) to which the reflective, non-reflective, and/or retroreflective sheeting may be attached. Information may be printed, formed, or otherwise embodied on the sheeting using any one or more of an ink, a dye, a thermal transfer ribbon, a colorant, a pigment, and/or an adhesive coated film. In some examples, information is formed from or includes a multi-layer optical film, a material including an optically active pigment or dye, or an optically active pigment or dye.

In the example of FIG. 1, optically active article 108 (e.g., a license place) includes printed information 126A-126F ("information 126"). In FIG. 1, each instance of information 126 is a symbol from a symbol set. The symbol set may be an alphabet, number set, and/or any other set of glyphs. In FIG. 1, the symbol set includes at least the letters of English alphabet and Arabic numerals.

In the example of FIG. 1, each symbol includes one or more encoding regions 128A-128C. An encoding region may be a location, region, or area of optically active article 108 that may be selectively printed, in accordance with techniques of this disclosure, with either (1) visibly-opaque, infrared-transparent cyan, magenta and yellow (CMY) inks or (2) visibly-opaque, infrared-opaque inks (e.g., inks containing carbon black). In some examples, an encoding region is embedded within an instance of printed information, such embedded data unit 128A being included within the boundary of printed information 126A (e.g., Arabic numeral '2'). A boundary or perimeter of a symbol may be an interface between a first set of pixel values that represent the symbol and a second set of pixel values that represent space (e.g., whitespace) surrounding or within the representation of the symbol. In some examples, a boundary or perimeter of a symbol may have more than one interface, such as an 'A' which includes an interior interface (e.g., the center whitespace within the 'A' glyph) and an exterior interface (e.g., the whitespace surrounding the 'A' glyph). In some examples, an encoding region may be "active" or "inactive". In the example of FIG. 1, an encoding region (e.g., 128A), which is printed with visibly-opaque, infrared-transparent ink, and that reflects light above a threshold light intensity is active, while an encoding region (e.g., 128B), which is printed with visibly-opaque, infrared-opaque ink, and that does not reflect light above the threshold light intensity is inactive. In an alternative example, an encoding region, which is printed with visibly-opaque, infrared-transparent ink, and that reflects light above a threshold light intensity is inactive, while an encoding region, which is printed with visibly-opaque, infrared-opaque ink, and that does not reflect light above the threshold light intensity is active. For purposes of this disclosure, active encoding regions are generally described as regions printed with visibly-opaque, infrared-transparent ink.

As shown in FIG. 1, encoding regions 128A and 128C are printed with a combination of visibly-opaque, infrared-transparent CMY ink (e.g., "process black") and encoding region 128B is printed with visibly-opaque, infrared-opaque inks. For purposes of illustration, encoding region 128B printed with the visibly-opaque, infrared-transparent CMY ink is shown as cross-hatched in FIG. 1, although under the human-visible light spectrum, encoding region 128B may appear as other non-encoding regions of information 126A (e.g., flat black). In FIG. 1, printed information 126A, may be printed with a combination of visibly-opaque, infrared-opaque black ink except for the location of embedded data units 128.

When printed information 126 is exposed to infrared light 127 from light source 104, the infrared light will reflect back to image capture device 102 from locations corresponding to active encoding regions 128A and 128C. Since inactive encoding region 128B is printed with visibly-opaque, infrared-opaque inks, infrared light 127 is absorbed within the boundary of the '2' character everywhere except active encoding regions 128A and 128C. Infrared light will reflect from optically active article 108 at the locations of active encoding regions 128A and 128B, as well as other active encoding regions of optically active article 108 that are printed with visibly-opaque, infrared-transparent inks (and not visibly-opaque, infrared-opaque inks). As such, an infrared image captured by image capture device 102 will appear as shown in FIG. 1, with whitespace, gaps, or voids in locations printed with visibly-opaque, infrared-transparent inks, while other locations printed with visibly-opaque, infrared-opaque inks will appear as black or otherwise visually distinguishable from the visibly-opaque, infrared-transparent inks.

In some examples, active encoding regions 128A and 128C, when printed with visibly-opaque, infrared-transparent inks, appear opaque or black to image capture device 102 under a first spectral range and appear transparent or white to image capture device 102 under a second spectral range. Portions of information 126A (including inactive encoding region 128B) printed with visibly-opaque, infrared-opaque inks appear opaque or black to image capture device 102 under the second spectral range and appear opaque or black to image capture device 102 under the first spectral range. In some embodiments, the first spectral range is from about 350 nm to about 750 nm (i.e., visible light spectrum) and the second spectral range is from about 700 nm to about 1100 nm (i.e., near infrared spectrum). In some embodiments, the first spectral range is from about 700 nm to about 850 nm, and the second spectral range is between 860 nm to 1100 nm.

In some embodiments, active encoding regions 128A and 128C appear opaque or black to capture device 102 under a first lighting condition and appear transparent or white to capture device 102 under a second lighting condition, whereas inactive encoding region 128B appears opaque or black to capture device 102 under the second lighting condition and under the first lighting condition. In some embodiments, the first lighting condition is an ambient visible condition (i.e., diffuse visible light) and the second lighting condition is a visible retroreflective condition (i.e., coaxial visible light). In some embodiments, the position of the light source(s) is different in the first and second lighting conditions.

In some examples, suitable printing techniques include screen printing, flexographic printing, thermal mass transfer printing and digital printing such as, for example, laser printing and inkjet printing. One advantage of using digital printing is that information can be easily and quickly customized/altered to meet customer needs, without having to produce new screens or flexographic sleeves.

In some examples, printing of the encoding regions and the non-encoded region portions of the symbols are done in registration so that they completely overlap. In some embodiments, active encoding regions are printed first on the retroreflective substrate, followed by printing of the non-encoded region portions of the symbols, or vice versa. In some examples, the human-readable information and/or machine-readable information are printed using the materials described in co-pending U.S. Patent Application No. 61/969889, the disclosure of which is incorporated herein by reference in its entirety, although other suitable materials may also be used.

In some embodiments, encoded regions include at least one of an infrared-reflecting, infrared-scattering and infrared-absorbing material. The use of these materials create contrast in the infrared spectrum, and therefore appear "dark" when viewed under such conditions. Exemplary materials that can be used include those listed in U.S. Pat. No. 8,865,293 (Smithson et al), the disclosure of which is incorporated herein by reference in its entirety.

As shown in FIG. 1, system 100 may include image capture device 102. Image capture device 102 may convert light or electromagnetic radiation sensed by image capture sensors 106 into information, such as digital image or bitmap comprising a set of pixels. Each pixel may have chromiance and/or luminance components that represent the intensity and/or color of light or electromagnetic radiation. In some examples, a first set of pixel values, which represent one or more active encoding regions of the one or more encoding regions, are within a first range of pixel values, a second set of pixel values, which represent a remaining portion of the at least one symbol that excludes the one or more active encoding regions, are within a second range of pixel values that are different from the first range of pixel values. In some examples, the image is a first image and wherein the first image of the optically active article is captured in a first spectral range within the near-infrared spectrum, a second image of the optically active article is captured in a second spectral range within the visible spectrum, a third set of pixel values that represent the at least one symbol in the second image are within the second range of pixel values, and a first proportion of the third set of pixel values that represent the at least one symbol is greater than a second proportion of the second set of pixel values that represent the at least one symbol.

Image capture device 102 may include one or more image capture sensors 106 and one or more light sources 104. In some examples, image capture device 102 may include image capture sensors 106 and light sources 104 in a single integrated device, such as shown in FIG. 1. In other examples, image capture sensors 106 or light sources 104 may be separate from or otherwise not integrated in image capture device 102. Examples of image capture sensors 106 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In the example, image capture device 102 includes at least two different sensors for detecting light in two different wavelength spectrums. In some embodiments, a first image capture and a second image capture sensor substantially concurrently detect the first and second wavelengths. Substantially concurrently may refer to detecting the first and second wavelengths within 10 milliseconds of one another, within 50 milliseconds of one another, or within 100 milliseconds of one another to name only a few examples.

In some examples, one or more light sources 104 include a first source of radiation and a second source of radiation. In some embodiments, the first source of radiation emits radiation in the visible spectrum, and the second source of radiation emits radiation in the near infrared spectrum. In other embodiments, the first source of radiation and the second source of radiation emit radiation in the near infrared spectrum. As shown in FIG. 1 one or more light sources 104 may emit radiation (e.g., infrared light 127) in the near infrared spectrum.

In some examples, image capture device 102 includes a first lens and a second lens. In some examples, image capture device 102 captures frames at 50 frames per second (fps). Other exemplary frame capture rates include 60, 30 and 25 fps. It should be apparent to a skilled artisan that frame capture rates are dependent on application and different rates may be used, such as, for example, 100 or 200 fps. Factors that affect required frame rate are, for example, application (e.g., parking vs, tolling), vertical field of view (e.g., lower frame rates can be used for larger fields of view, but depth of focus can be a problem), and vehicle speed (faster traffic requires a higher frame rate).

In some examples, image capture device 102 includes at least two channels. The channels may be optical channels. The two optical channels may pass through one lens onto a single sensor. In some examples, image capture device 102 includes at least one sensor, one lens and one band pass filter per channel The band pass filter permits the transmission of multiple near infrared wavelengths to be received by the single sensor. The at least two channels may be differentiated by one of the following: (a) width of band (e.g., narrowband or wideband, wherein narrowband illumination may be any wavelength from the visible into the near infrared); (b) different wavelengths (e.g., narrowband processing at different wavelengths can be used to enhance features of interest, such as, for example, a license plate and its lettering (license plate identifier), while suppressing other features (e.g., other objects, sunlight, headlights); (c) wavelength region (e.g., broadband light in the visible spectrum and used with either color or monochrome sensors); (d) sensor type or characteristics; (e) time exposure; and (f) optical components (e.g., lensing).

In the example of FIG. 1, image capture device 102 may be stationary or otherwise mounted in a fixed position and the position of optically active article 108 may not be stationary. Image capture device 102 may capture one or more images of optically active article 108 as vehicle 110 approaches or passes by image capture device 102. In other examples, however, image capture device 102 may be not be stationary. For instance, image capture device 102 may be in another vehicle or moving object. In some examples, image capture device 102 may be held by a human operator or robotic device, which changes the position of image capture device 102 relative to optically active article 108.

In the example of FIG. 1, image capture device 102 may be communicatively coupled to computing device 112 by one or more communication links 130A and 130B. Image capture device 102 may send images of optically active article 108 to computing device 116. Communication links 130A and 130B may represent wired or wireless connections. For instance communication links 130A and 130B may be wireless Ethernet connections using a WiFi protocol and/or may be wired Ethernet connections using Category 5 or Category 6 cable. Any suitable communication links are possible. In some examples, image capture device 102 is communicatively coupled to computing device 116 by a network 114. Network 114 may represent any number of one or more network connected devices including by not limited to routers, switches, hubs, and interconnecting communication links that provide for forwarding of packet and/or frame-based data. For instance, network 114 may represent the Internet, a service provider network, a customer network, or any other suitable network. In other examples, image capture device 102 is communicatively coupled to computing device 116 by a direct connection, such as Universal Serial Bus (USB) link.

Computing device 116 represents any suitable computing system, which may be remote from image capture device 102, such as one or more desktop computers, laptop computers, mainframes, servers, cloud computing systems, etc. capable of sending and receiving information with image capture device 102. In some examples, computing device 116 that implements techniques of this disclosure. For instance, techniques of this disclosure provide for creating optically active articles that include embedded data, and later reading such optically active articles to perform operations based on the embedded data. For instance, a motor vehicle government organization may generate optically license plates as optically active articles with data encoded in the articles, in accordance with techniques of this disclosure. Such a license plate may be attached to a vehicle and later read by image capture device 102 while the vehicle is operating on the highway. Using techniques of this disclosure computing device 116 may determine data embedded in the optically active article and perform one or more operations, such as collecting a toll, performing a counterfeit plate determination, to name only a few examples.

In the example of FIG. 1, optically active article 108 may be generated initially with instances of information 126A-126F that include encoding regions 128A-128C and other encoding regions illustrated in FIG. 1. In a manufacturing or printing process, a retroreflective sheet is applied to an aluminum plate and each instance of information 126A-127 is printed based on a printing specification that may be provided by a human operator or generated by a machine. A printing specification may specify one or more locations to be printed with visibly-opaque, infrared-opaque inks or visibly-opaque, infrared-transparent inks, i.e., the printing specification may specify one or more active and inactive encoding regions. For instance, the printing specification may specify one or more symbols from a symbol set, where a particular symbol includes one or more encoding regions. The printing specification may indicate which encoding regions embedded in a symbol are printed with visibly-opaque, infrared-opaque inks (e.g., are inactive) and which other encoding regions embedded in the symbol are printed with visibly-opaque, infrared-transparent inks (e.g., are active).

As described above, the printing specification may be generated by a human operator or by a machine. For instance a printer that prints visibly-opaque, infrared-opaque inks and visibly-opaque, infrared-transparent inks may include a user interface and/or be communicatively coupled to a computing device (not shown) that provides a user interface by which a human operator can input, specify, or otherwise provide the printing specification for the optically active article. For instance, the human operator may specify one or more symbols to be printed as instances of information 126A-126F, as shown in FIG. 1. Each symbol may include one or more encoding regions. The encoding regions may be positioned at fixed, pre-defined positions that are specific to the particular symbol. The fixed, pre-defined positions may be known to, for example, computing device 116, so that computing device 116 may determine whether an encoding region at a particular position has been printed with visibly-opaque, infrared-opaque inks and visibly-opaque, infrared-transparent inks. An encoding region may represent two or more different states. For instance, an inactive encoding region printed with visibly-opaque, infrared-opaque inks may represent a '1', while an active encoding region printed with visibly-opaque, infrared-transparent inks may represent a '0'. As such, in the example of FIG. 1, each instance of information, such as instance of information 126A, may represent $2^3$ different possible values.

In some instances, the human operator may include an encoding a particular value in a set of symbols. For instance, the human operator may include an encoding of a bitstring in a set of symbols, where the set of symbols represent a license plate string and the bitstring is data embedded in the license plate string. A bitstring in FIG. 1, 010101010001010110 may be represented as follows, where an inactive encoding region printed with visibly-opaque, infrared-opaque inks may represent a '1' and an active encoding region printed with visibly-opaque, infrared-transparent inks may represent a '0':

| 2 | 5 | 0 | R | Z | A |
|---|---|---|---|---|---|
| 010 | 101 | 010 | 001 | 010 | 110 |

In some examples, the bitstring may be subdivided into multiple fields. For instance, the higher ordered 9 bits (010101010) corresponding to '250' may represent a vehicle model, while the lower ordered 9 bits (001010110) may represent an issuing state and year for the license plate. In some examples, when specifying the print specification, the human operator may submit a bitstring 010101010001010110 to the user interface and the corresponding symbols selected by the user to the user interface. In another example, the user may specify one or more characters or strings from a character set that are translated by a computing device into the bitstring 010101010001010110. For instance, a set of data {vehicle model, license issue state, license issue year} is translated to bitstring 010101010001010110, and the bitstring is used to encode the encoding regions in the symbols. In still other examples (further described in FIGS. 11 and 13), the human operator may specify different symbol variants from a symbol set that includes multiple symbol variants of the same symbol but with different encodings of the encoding regions. For instance, a symbol set may include multiple variants of the R character with the following values: {$R_0$:000}, {$R_1$:001} . . . {$R_7$:111}. To encode a bitstring in a particular set of symbols, the human operator may specify the set of symbol variants that correspond to bitstring 010101010001010110, where for example {$R_1$:001} corresponds to the underlined bit positions. In some examples, the user may specify one or more characters or strings from a character set that are translated to a set of symbol variants comprising encoding regions that are encoded to represent the bit string for the one or more characters or strings from a character set. For instance, a set of data {vehicle model, license issue state, license issue year} is translated to bitstring {$2_2$, $5_5$, $0_2$, $R_1$, $Z_2$, $A_6$}.

Using any of the aforementioned techniques or other suitable techniques, a human operator may provide a printing specification that causes a printer print optically active article 108 with the active and inactive encoding regions as shown in FIG. 1. Any of the foregoing techniques may also be performed automatically over a multiple instances of user input for print specifications. For instance, any of the foregoing techniques may be used with a list, group, or spreadsheet of information that comprises multiple instances of user input which may be processed as a batch to provide a respective printing specifications for each respective instance of user input (e.g., a spreadsheet of user input values are input to into a computing device that causes a printer to print a separate optically active article for each instance of user input).

In the example of FIG. 1, computing device 116 includes an optical character recognition component 118 (or "OCR module 118), decoding component 123, service component 122 and user interface (UI) component 124. Components 118, 120, 122, and 124 may perform operations described herein using software, hardware, firmware, or a mixture of both hardware, software, and firmware residing in and executing on computing device 116 and/or at one or more other remote computing devices. In some examples, components 118, 120, 122 may be implemented as hardware, software, and/or a combination of hardware and software. Computing device 116 may execute components 118, 120, 122 with one or more processors. Computing device 116 may execute any of components 118, 120, 122 as or within a virtual machine executing on underlying hardware. Components 118, 120, 122 may be implemented in various ways. For example, any of components 118, 120, 122 may be implemented as a downloadable or pre-installed application or "app." In another example, any of components 118, 120, 122 may be implemented as part of an operating system of computing device 116.

In the example of FIG. 1, vehicle 110 may be driving on a roadway and approach image capture device 102. Image capture device 102 may cause light source 104 to project infrared light 127 in the direction of vehicle 110. At substantially the same time as light source 104 is projecting infrared light 127, image capture device 106 may capture one or more images of optically active article 108, such as image 109. Substantially the same time may be at the same time or within 10 milliseconds, 50, milliseconds, or 100 milliseconds. Image 109 may be a bitmap in which visibly-opaque, infrared-opaque inks appear as black pixels and visibly-opaque, infrared-transparent inks appear as white pixels. The resulting image 109 may be stored as a bitmap, which image capture device 102 sends to computing device 116 via network 114.

OCR component 118 initially receives the bitmap representing image 109, which represents symbols as instances of information 126A-126F. As shown in FIG. 1, image 109 includes at least one symbol (e.g., a '2') that comprises a set of one or more encoding regions 128A-128C embedded with the symbol. In response to receiving image 109, OCR component 118 performs optical character recognition on an image region 129 that includes instance of information 126A. Based on OCR component 118 performing optical character recognition, OCR component 118 determines that image region 129 of image 109 represents the at least one symbol '2'. OCR component 118 may implement any one or more OCR techniques including but not limited to matrix matching and feature matching. Matrix matching may perform pixel-by-pixel comparison of one or more portions of image region 129 to a set of one or more stored glyphs, one of which corresponds to the symbol '2'. Feature matching decomposes various features (e.g., lines, loops, line direction, intersections, etc.) of the instance of information 126A, which are compared to glyph features of a set of corresponding symbols to identify the symbol '2'.

In the example of FIG. 1, decoding component 120 may receive data from OCR component 118 that indicates the symbol '2'. In some examples, OCR component 118 may send a set of symbols and corresponding confidence values that indicate respective likelihoods that an instance of information for a particular image region is a particular symbol (e.g., {{'2':85% confidence}, 'Z':15% confidence}}). Decoding component 120 receives the data indicating the symbol '2' and performs a lookup to retrieve location data that specify the positions of encoding regions within the symbol '2' that is included in image 109. For instance, computing device 116 may include location data for each symbol in a symbol set that includes encoding regions. The location data may include coordinates that specify where in a symbol the encoding regions are located. In some examples, location data may include an image of a symbol with markers, indicators or other data that indicate where each encoding region is located within a symbol. In this way, because decoding component 120 determined that instance of information 126A represents a symbol '2', decoding component 120 can identify the locations of encoding regions 128A-128C in the symbol '2'. Locations of encoding regions for a 'Z' may be in locations different than the locations for encoding regions of the symbol '2'.

Decoding component 120, using the location data, determines the locations of encoding regions 128A, 128B, and 128C within the symbol '2' that is represented by image region 129. Decoding component 120 determines respective values of each of the one or more encoding regions 128A-128C based on whether light (e.g., infrared light in FIG. 1) is reflected from particular locations of optically active article 108 that correspond to the one or more encoding regions 128A-128C. For instance, decoding component 120 determines that active encoding regions 128A and 128C are white (e.g., reflect the infrared light), while inactive encoding region 128B is black (e.g., absorbed the infrared light). Decoding component 120 may assign a value of '0' to active encoding regions 128A and 128C that are white and '1' to inactive encoding region 128B that is black. Accordingly, decoding component 120 may determine the bitstring 010 is represented by the values of encoding regions 128A-128C. Decoding component 120 may perform this process as described above with respect to the '2' symbol for each of the other instances of information 126B-126F either serially or in parallel to generate the bitstring 010101010001010110.

Service component 122 may receive bitstring 010101010001010110 from decoding component 120. Service component 122 may be provide any number of services, by performing one or more operations. For instance, service component 122 may provide a toll collection service, a vehicle registration verification service, a security service or any other suitable service. A toll collection service may identify a vehicle and collect a tolling fee from a payment account of the vehicle owner. For instance, a bitstring received by service component 122 may include information that is usable by the bitstring to collect the tolling fee. A vehicle registration verification service may verify that vehicle registration is current, based on the bitstring, by accessing a registration database. A security service may determine whether a particular license plate associated with the vehicle is counterfeit based on the bitstring or absence thereof. Any other suitable services may also be provided by service component 122. In the example of FIG. 1, service component 122 may determine whether the license plate associated with the vehicle is counterfeit based on the bitstring 010101010001010110 encoded in the encoding regions. Service component 122 may send data to UI component 124 that indicates whether the license plate is counterfeit.

Computing device 100 may also include UI component 106. UI component 106 of computing device 102 may receive indications of user input from input devices such as a touch screen, keyboard, mouse, camera, sensor or any other input device. UI component 106 may transmit, as output to other modules and/or components, the indications of user input, such that other components may perform operations. UI component 106 may act as an intermediary between various components and modules of computing device 116 to process and send input detected by input devices to other components and modules, and generate output from other components and modules that may be presented at one or more output devices. For instance, UI component 106 may generate one or more user interfaces for display. The user interfaces may correspond to services provided by one or more of service components 112. For instance, if the license plate for vehicle 110 has expired, UI component 106 may generate an alert that is output for display in a graphical user interface. UI component 106 may, in some examples, generate one or more alerts, reports, or other communications that are sent to one or more other computing devices. Such alerts may include but are not limited to: emails, text messages, lists, phone calls, or any other suitable communications.

As described above, service component 122 may process a variety of data, which may be encoded in various encoding regions. Example data may include the state or jurisdiction information. State or jurisdiction data can be encoded directly into an optically active article, and it can be used to confirm other state recognition techniques or utilized on its own. Additionally, there are a number of custom plate images being released on an increasing basis, which could each have their own encoding block used to uniquely identify the plate. These could first be grouped inside each state, or by category like "critical habitat" etc. This information could be utilized to make jurisdiction determinations, but may also be used to help choose a particular font for OCR of the plate characters, or may be utilized to help create a more robust decoding of the characters in the plate.

Other data that may be embedded into an optically active article may include: vehicle type or classification, registration information, registration month, access controls for example to a parking garage or restricted entry location, Electronic Vehicle Registration (EVR) type data structures, special plate designations (handicapped for example), to name only a few examples. Techniques of the disclosure could encode data such as Vehicle Identification Number (VIN), or other specific identification marks. Other data that could be encoded includes but is not limited to: issue date, print location, who printed it, ink type, other administrative and pedigree information. The encoded data could also include a special coding for temporary plates, short term privileges, or promotional plates. This encoded data could enable a license plate or other optically active article to be treated like a credential for the vehicle, that would be issued and only valid for a period of time as coded in the characters, or it could require a reissue after a certain amount of time in order to help encourage compliance or adherence to a particular protocol for one reason or another.

Figure 2:
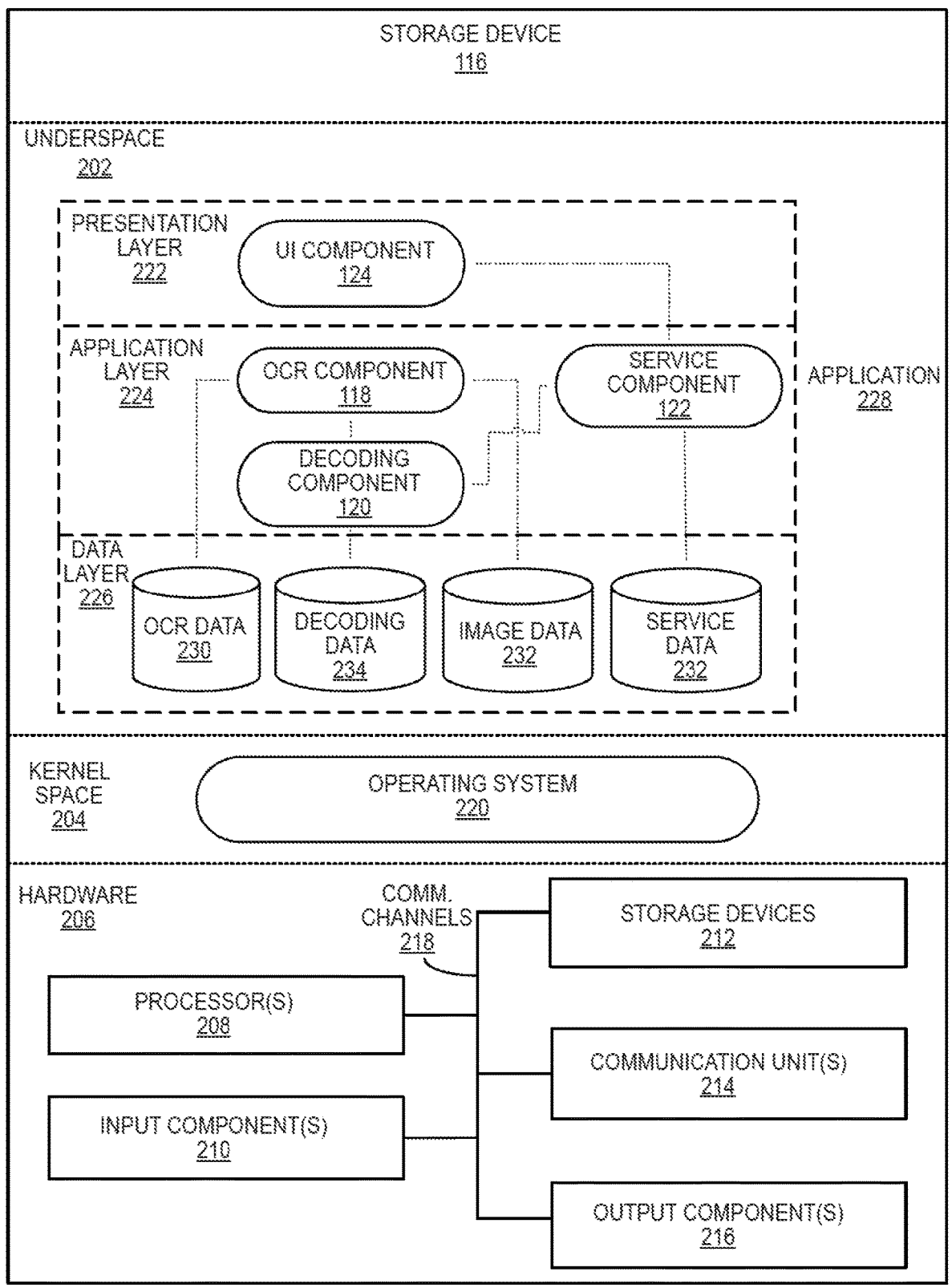
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 116, as shown in FIG. 1. Many other examples of computing device 116 may be used in other instances and may include a subset of the components included in example computing device 116 or may include additional components not shown example computing device 116 in FIG. 2. In some examples, computing device 116 may be a server, tablet computing device, smartphone, wrist- or head-worn computing device, laptop, desktop computing device, or any other computing device that may run a set, subset, or superset of functionality included in application 228.

As shown in the example of FIG. 2, computing device 116 may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202.

As shown in FIG. 2, hardware 206 includes one or more processors 208, input components 210, storage devices 212, communication units 214, and output components 216. Processors 208, input components 210, storage devices 212, communication units 214, and output components 216 may each be interconnected by one or more communication channels 218. Communication channels 218 may interconnect each of the components 208, 210, 212, 214, and 216 for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within computing device 116. For example, processors 208 on computing device 116 may receive and execute instructions stored by storage devices 212 that provide the functionality of components included in kernel space 204 and user space 202. These instructions executed by processors 208 may cause computing device 116 to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 242 of computing device 116 may receive input. Examples of input are tactile, audio, kinetic, and optical input, to name only a few examples. Input components 242 of computing device 116, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 216 of computing device 116 may generate output. Examples of output are tactile, audio, and video output. Output components 216 of computing device 116, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 216 may be integrated with computing device 116 in some examples. In other examples, output components 216 may be physically external to and separate from computing device 116, but may be operably coupled to computing device 116 via wired or wireless communication. An output component may be a built-in component of computing device 116 located within and physically connected to the external packaging of computing device 116 (e.g., a screen on a mobile phone). In another example, presence-sensitive display 202 may be an external component of computing device 116 located outside and physically separated from the packaging of computing device 116 (e.g., a monitor, a projector, etc. that shares a wired and/or wireless data path with a tablet computer).

One or more communication units 214 of computing device 116 may communicate with external devices by transmitting and/or receiving data. For example, computing device 116 may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a network interface card (e.g. such as an Ethernet card), an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

One or more storage devices 212 within computing device 116 may store information for processing during operation of computing device 116. In some examples, storage device 212 is a temporary memory, meaning that a primary purpose of storage device 212 is not long-term storage. Storage devices 212 on computing device 116 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 2, application 228 executes in userspace 202 of computing device 116. Application 228 may be logically divided into presentation layer 222, application layer 224, and data layer 226. Presentation layer 222 may include user interface (UI) component 228, which generates and renders user interfaces of application 228. Application 228 may include, but is not limited to: UI component 124, OCR component 118, decoding component 120, and one or more service components 122. For instance, application layer 224 may OCR component 118, service component 122, and decoding component 120. Presentation layer 222 may include UI component 124.

Data layer 226 may include one or more datastores. A datastore may store data in structure or unstructured form. Example datastores may be any one or more of a relational database management system, online analytical processing database, table, or any other suitable structure for storing data. OCR datastore 230 may include matrix matching data to perform pixel-by-pixel comparisons, such as stored glyphs. OCR datastore 230 may include feature matching data to perform feature identification, such as glyph features of a set of corresponding symbols. Decoding data 234 may include location data that specify the positions of encoding regions within symbols that are printed on optically active articles. Decoding data 234 may include location data, such as coordinates that specify where in a symbol the encoding regions are located. As described in FIG. 1, location data may include an image of a symbol with markers, indicators or other data that indicate where each encoding region is located within a symbol. Service data 232 may include any data to provide and/or resulting from providing a service of service component 122. For instance, service data may include vehicle registration information, security information (e.g., cyclic redundancy codes or checks), user information, or any other information. Image data 232 may include one or more images that are received from one or more image capture devices. In some examples, the images are bitmaps, Joint Photographic Experts Group images (JPEGs), Portable Network Graphics images (PNGs), or any other suitable graphics file formats.

In the example of FIG. 2, one or more of communication units 214 may receive, from an image capture device, an image of an optically active article that includes a set of one or more symbols of a character set. In some examples, UI component 124 or any one or more components of application layer 224 may receive the image of the optically active article and store the image in image data 232. At least one symbol of the set of one or more symbols represented in the image comprises a set of one or more encoding regions that are embedded with the symbol.

In response to receiving the image, OCR component 118 may determine that a particular image region of the image represents the at least one symbol. For instance, as described in FIG. 1, by applying one or more OCR techniques to the image region, OCR component 118 may determine that the image region represents the symbol '2'. As an example, OCR component 118 may compare the image region to OCR data 230 to identify a match. Upon determining a matching between OCR data 230 and the image region, OCR component 118 determines the symbol associated with the OCR data that resulted in a match. OCR component 118 may send data to decoding component 120 that indicates the symbol '2'. In some examples, OCR component 118 may also send an identifier of the image for which OCR was performed to decoding component 120. Decoding component 120 uses data indicating the symbol '2' to select location data from decoding data 234. The location data indicates the various positions of encoding regions within the symbol '2'.

In some examples, after an image is captured, OCR component 118 performs pre-processing to determine if there is an area of high contrast in the image. This process is referred to as image filtering. In some embodiments, high contrast is effected by the use of optically active substrates (e.g, reflective or retroreflective). Images without high contrast areas are discarded by OCR component 118. Remaining images are subsequently advanced to a second pre-processing step in which the image of the high contrast area is isolated and normalized. Normalization includes, for example, de-skew, rotation, size adjustment and scale adjustment of the high contrast area. After normalization, OCR component 118 may perform one or more OCR techniques.

Decoding component 120 may determine, based at least in part on the determination that the particular image region of the image represents the at least one symbol, respective values of each of the one or more encoding regions. For instance, because decoding component 120 has determined the particular image region corresponds to the symbol '2', decoding component 120 can select the location data to identify the pre-defined locations of encoding regions within the symbol '2'. The respective values for the encoding regions are based on whether light is reflected from particular locations of the optically active article that correspond to the one or more encoding regions. Upon determining one or more particular values (e.g., bitstring) corresponding to the encoding regions of the symbols printed on the optically active article, decoding component 120 may send the particular value to service component 122.

Service component 122 may perform one or more operations based on the one or more particular values, such as performing a security check to determine whether the optically active article (e.g., license plate) is a counterfeit. Service component 122 may, for example, query service data 232 to select a CRC code or CRC check data. Service component 122 may use the service data 232 to confirm whether the optically active article is a counterfeit. In response to, for example, determining that the optically active article is a counterfeit, service component 122 may send data to UI component 124 that causes UI component 124 to generate an alert for display. UI component 124 may send data to an output component of output components 216 that causes the output component to display the alert.

In some examples, the one or more operations performed by computing device 116 may include performing security or verification operations. For instance, techniques of the disclosure may improve the probability or confidence level that that the values of encoding units have been properly decoded. Various input parameters, such as input parameters like contrast ratio, focus, and pixel density may affect the probability or confidence level with which computing device 116 can decode various encoding units in an optically active article.

In some examples, computing device 116 may receive multiple images of an optically active article within a particular time duration. For instance, an image capture device may send multiple images to computing device 116 that were each taken within a particular time duration. In some examples, the time duration may be 50 milliseconds, 500 milliseconds, 1 second or 5 seconds. In some examples, the time duration may be any value between 10 milliseconds and 10 seconds. Application 228 may, perform the techniques as described above in FIG. 2, but repeatedly for each image captured within the particular time duration. Decoding component 120 may evaluate the values for each image and provide a value to service component 122 that occurred most frequently or that was the most likely value.

In some examples, application 228 may compare one or more values received from a source other than the optically active article with one or more values received from decoding component 120. For example, if a vehicle has an RFID tag that is decoded to a particular value, and the value decoded by decoding component 120 matches the RFID value, service component 122 may determine that the value from the optically active article is correct or has a higher confidence level that it is correct.

In some techniques of the disclosure may provide a Cyclic Redundancy Check or other suitable error detecting codes. For instance, decoding component 120 may calculate a redundancy check based on one or more encoding regions within symbols of an optically active article, which can be calculated to ensure the optically active article has properly been decoded. In some examples, a CRC check code is embedded as data into the optically active article, which decoding component 120 computes uniquely based on the symbols in the plate, and/or other embedded data in the plate to validate that decoding component 120 has correctly interpreted the data contained both on and in the characters. Decoding component 120 may generate a confidence score based on the number of bits of data that decoding component 120 uses to compute the CRC.

In some examples, decoding component 120 may implement multiple security and/or verification techniques, and apply each of the techniques to an image. Pairing multiple security and/or verification techniques together can improve the confidence that decoding component 120 has achieved a successful correct of an optically active article and OCR decode.

In some examples, a redundancy check performed by decoding component 120 may provide error correction in one or more decoded values (e.g., a bitstream or data stream) if there is a bit that is less differentiated in the decode. This can happen by testing the close possibilities for that decoded character against the CRC code, and selecting the correct answer based on which value makes the CRC pass its test. For instance, if decoding component 120 decodes a bitstring of 001101, which does not satisfy a CRC test, decoding module 120 may modify a bit, such as changing the lowest order bit to a '0', to determine if 001100 satisfies the CRC test.

Redundancy checking may also be useful to reconstruct an obstructed or unreadable character. There are many situations in which part of a plate or character string is illegible in an image: shadow, dirt, obstruction, bend, reflection, etc. By encoding redundant information into the characters using electronic code correction, it is possible to reconstruct the missing value based on the data contained in the other characters. With the data from one or more encoding regions in symbols, decoding component 120 can perform electronic code correction.

Service component 122 may implement one or more versioning techniques. With many possible data encodings and possible unique representations of optically active articles (e.g., license plates), service component 122 may implement one or more techniques to control which optically active articles have what data stored in them. In this way, service component 122 may accommodate for encoding changes while still having legacy plates with possible other encodings on the road. As an example, a Department of Motor Vehicles (DMV) may wish to change what data it is encoding in a license plate to accommodate some new need or desire the law enforcement agency has. In order to prevent a full reissue of all license plates in the jurisdiction of the DMV with the new encoding, service component 122 may implement one or more techniques to differentiate the "old" encode scheme vs. the "new" scheme that will be implemented.

In some examples, a version number may be included in the bitstring for the highest order symbol, lowest order symbol or any other symbol in the license plate. The version number may be based on whether one or more encoding units of one or more symbols are active or inactive. Service component 122 may query service data 232 using the version number to select data for the appropriate version when performing one or more operations for a service. In another example, a printer may create a barcode on the printed region of the plate that stores the version data.

In some examples, the CRC code or other suitable error detecting codes are changed each time the optically active article coding is changed. Decoding component 120, by checking against several CRC checks, can determine which version of the encoding is utilized. Having this versioning via CRC enables decoding component 120 to determine which version of the code is being used without dedicating any of the data bits to the version information.

In some examples, versioning a code may include adding a "salt" to the input of the CRC/hash with the version number, so instead of decoding component 120 applying a CRC check code as:

CRC(text=ABC123,region=23,version=0)

the decoding component 120 could apply the CRC check code as:

CRC(text=ABC123,region=23,version=1)

In some examples, counterfeit plate production could be reduced by including a random and undisclosed salt (e.g., salt=DjuyPwQ6VHrzGLmtRAUU) in the hash input which decoding component 120 would use for decoding as:

CRC(text=ABC123,region=23,version=1,
   salt=DjuyPwQ6VHrzGLmtRAUU)

Figure 3:
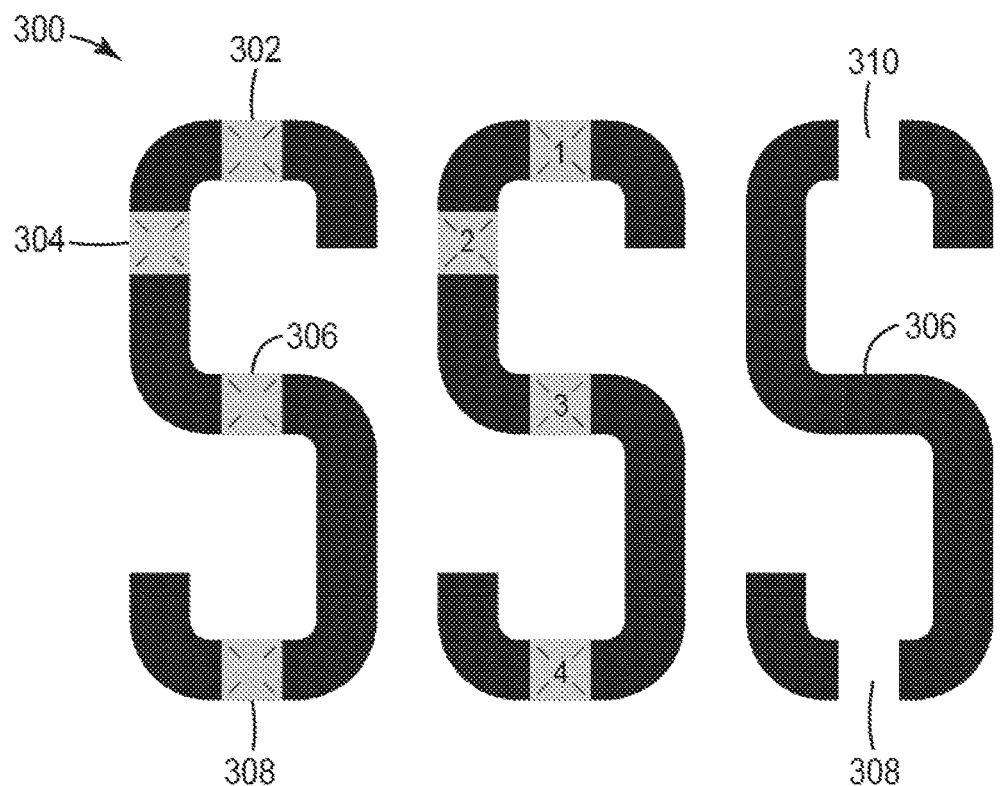
FIG. 3 is a conceptual diagram of a symbol with encoding regions that may be printed on an optically active article, in accordance with techniques of this disclosure.

FIG. 3 is a conceptual diagram of a symbol with encoding regions that may be printed on an optically active article, in accordance with techniques of this disclosure. FIG. 3 illustrates symbol 300A, which corresponds to the letter 'S' in the English alphabet. As shown in FIG. 3, symbol 300 includes four encoding regions 302, 304, 306, and 308. In some examples, each encoding region may take on a value of '0' or '1' based on whether visibly-opaque, infrared-transparent ink or visibly-opaque, infrared-opaque ink is printed at the location of the encoding region. In some examples, visibly-opaque, infrared-transparent ink printed at an encoding region may correspond to a '0', while in other examples, visibly-opaque, infrared-transparent ink printed at an encoding region may correspond to a '1'. In other examples, visibly-opaque, infrared-opaque ink printed at an encoding region may correspond to a '1', while in other examples, visibly-opaque, infrared-opaque ink printed at an encoding region may correspond to a '0'.

The numbers '1', '2', '3', and '4' in symbol 300B, shown for illustrative purposes in the respective encoding regions (but which may not be printed on the optically active article), may represent an ordering of bit positions in a bitstring where '1' represents the lowest order bit in a bit string and '4' represents a highest order bit in the bitstring. Although shown in sequential, ascending order from top to bottom (i.e., lowest bit position at the top-most encoding region of symbol 300), any ordering is possible. FIG. 3 further illustrates a portion of an image in which symbol 300C includes encoding region 310 as white and encoding region 306 as black. Symbol 300C may appear in an image taken with infrared light where the white portions reflect infrared light and the black portions absorb the infrared light.

Figures 4A, 4B:
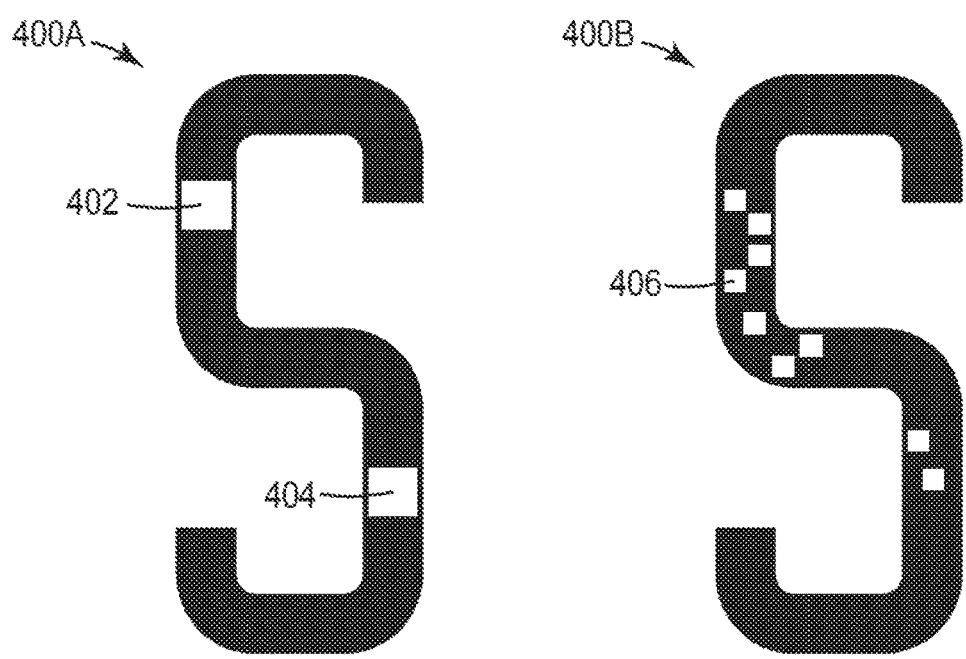
FIGS. 4A and 4B are conceptual diagrams of symbols that include encoding regions that may be printed on an optically active article, in accordance with techniques of this disclosure.

FIG. 4 is a conceptual diagram of symbols that include encoding regions that may be printed on an optically active article, in accordance with techniques of this disclosure. As shown in FIG. 4, symbol 400A includes encoding regions 402 and 404. Encoding regions 402 and 404 may be of a first size. Symbol 400B includes encoding regions of a second size, such as encoding region 406, which is smaller than the encoding regions 402 and 404. In some examples, a single symbol may have different encoding regions of different sizes.

The amount of data, or rather size of the gap may be a function of the camera image quality or pixel density across the plate. Taking symbol 400A as an example, some images may be captured at about 150 pixels per foot, which results in 150 pixels across the plate on average, or 16 pixels per character. This defines the working block size (which may be calculated at about 4×4 pixel minimum) for our data embedding techniques. With higher resolution image capture devices, a system may process a higher encoding region payload per symbol, such as shown by symbol 400B. Symbol 400B has data blocks half the length and height of the originally described block. This modification results in 4 times the potential data density, yet may only requires an image with twice the resolution.

FIG. 5A is a symbol set and FIGS. 5B-5D are corresponding conceptual diagrams of symbols that include encoding regions based on the symbol set that may be printed on an optically active article, in accordance with techniques of this disclosure. Although encoding regions are illustrated as square or rectangular gaps in various examples of this disclosure, an encoding region may be implemented in any visual form. For instance, encoding regions may be implemented as shapes, symbols, or any other visually distinguishable indicator. For instance, rather than using gaps as shown in FIG. 1, techniques of the disclosure can utilize any indicators.

FIG. 5A illustrates mappings that would support ten different markers embeddable at different encoding region locations, which would be decoded back to decimal values. Multiple encoding regions could be utilized in the same space on a character to represent different data states. Referencing FIGS. 5B and 5C demonstrate a '*' as a '0' and a '+' as a '1' in the binary number system, for example. This allows for a marker to always be present in a particular position, which also will aid the performance of the OCR algorithm and positively reinforce the data decoding process was successful; rather than having a zero be represented by a "no marker" representation. This could be further expanded to include more than two different markers at a given position to expand beyond binary encoding into higher base number systems.

FIG. 5A shows an association that would support 10 different markers embedded at the gap location which would be decoded back to their decimal value. That is, different markers of FIG. 5A printed as encoding regions may be decoded as corresponding to decimal numbers in a decimal number system. In FIG. 5B, a '+' sign 502 is embedded in symbol 500 as an encoding region. In some examples, the '+' may be mapped to some other data, such as a number in a numbering system, a symbol in a symbol set or any other key-value pair. FIG. 5C illustrates a symbol 504 with an encoding region printed as '*'. As described above with respect to FIG. 5A, the '*' may be decoded by a computing device to the number '8' in the decimal numbering system. In the example of FIG. 5C, a '*' may be used as an embedded marker, and the presence or absence of the marker would be treated the same as the absence or presence of a gap. This may improve OCR engine performance as the overall area of the symbol 'S' may be impacted less with these alternate embedded markers (e.g., '*', '+', etc.) as encoding regions. Several of the markers in FIG. 5A could be present in a single character, offering a dense embedded data environment as demonstrated in FIG. 5D.

Figure 6A:
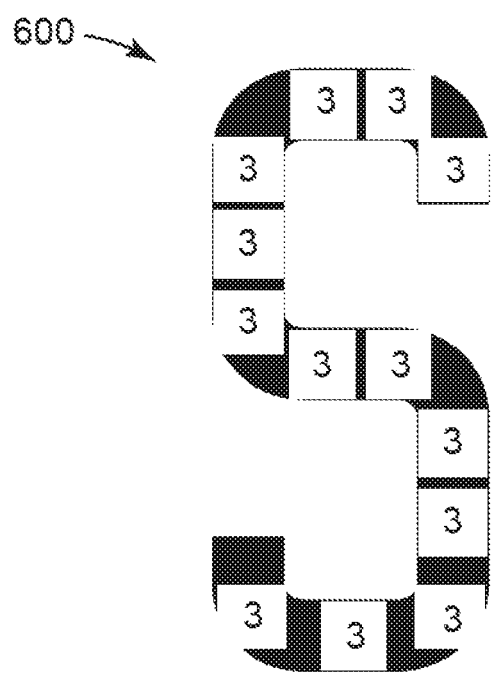
FIGS. 6A-6B are conceptual diagrams illustrating symbols having corresponding values based on the position of an encoding region, in accordance with one or more techniques of the disclosure.
Figure 6B:
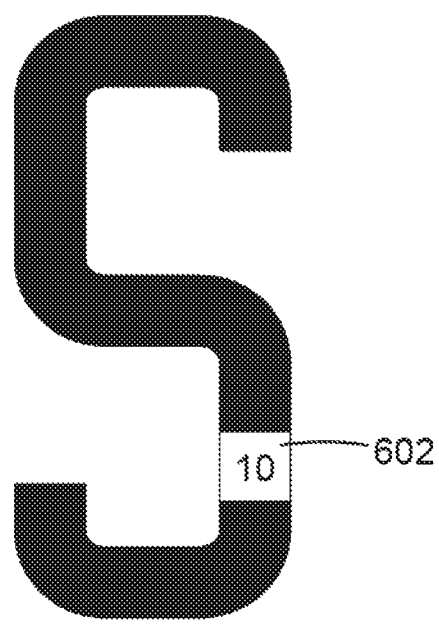

FIGS. 6A-6B are conceptual diagrams illustrating symbols having corresponding values based on the position of an encoding region, in accordance with one or more techniques of the disclosure. In some examples, absolute placement of encoding regions within particular locations of a symbol is tied to different data meanings. In some examples of this disclosure, the locations of embedded data units were predetermined and the "on" or "off" states indicate data.

FIG. 6A illustrates each possible location that an encoding region could be placed within symbol 600, and the position of an encoding region corresponds to a value. For instance, FIG. 6B shows an active encoding region at position '10' (e.g., reference number 602), and thus a computing device could determine from the position of the active encoding region, a value corresponding to the position 10 having an active encoding region. In the example of FIG. 6A, non-overlapping positions are illustrated, but in other examples, positions could overlap. The sensitivity to how much change is necessary to discern a different value may be based on the image capture device that's capturing the image and the printing technology to ensure the difference is within the fidelity of the print head/print pixel. In some examples, over multiple different variations inside of a single character may be possible.

Figure 7C:
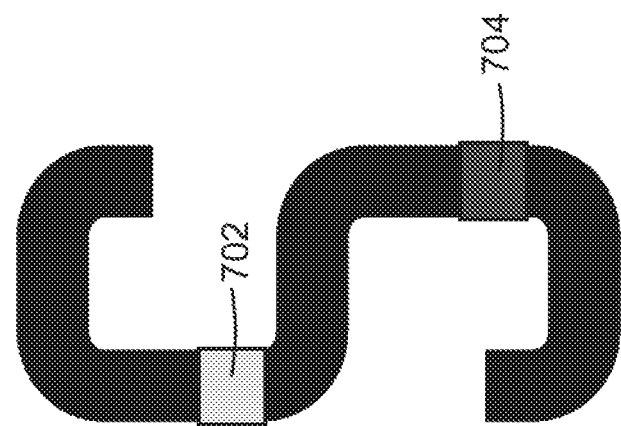
FIGS. 7A-7C illustrate encoding regions with gradient encodings, in accordance with techniques of this disclosure.
Figure 7B:
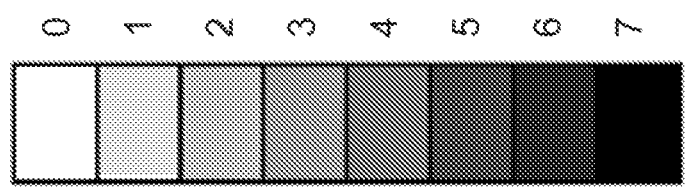
Figure 7A:
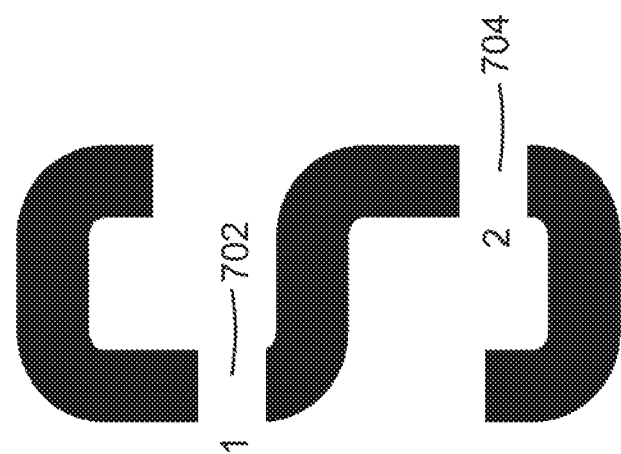

FIGS. 7A-7C illustrate encoding regions with gradient encodings, in accordance with techniques of this disclosure. As shown in FIG. 7A, symbol 700 includes two encoding regions, 702 and 704. A printer, in accordance with techniques of this disclosure may create an analog or gradient value by varying an amount of visibly-opaque, infrared-transparent ink, or greyscale value contained in the location of the encoding region. In some examples, a standard bitmap image is 8-bits, thus data could be encoded by placing the pixel intensity as the data contained in a specific gap. This could be done at the per greyscale value level, or divided into several buckets to provide some room for inconsistency or other noise effects. In the example of FIG. 1, encoding regions 702 and 704 are included in symbol 100. FIG. 7B illustrates different black levels that are used to represent 8 different values for each gap data field (gap location.). For instance, the lowest intensity value of FIG. 7B is mapped to a value of 0, while a highest intensity value is mapped to a value of 7. In FIG. 7C, encoding region 702 specifies a value of 1 based on the gradient and encoding region 704 specifies a value of 4. As such, a computing device, when decoding an image with encoding regions 702, 704 determines respective values of 1 and 4. Although described with respect to gradients, any variable distribution of visibly-opaque, infrared-transparent ink printed at encoding regions may be used to represent different sets of values, as similarly described in FIGS. 7A-7C. For instance, different patterns, cross-hatching, or any other suitable variable distribution of visibly-opaque, infrared-transparent ink may be used.

Figure 8:
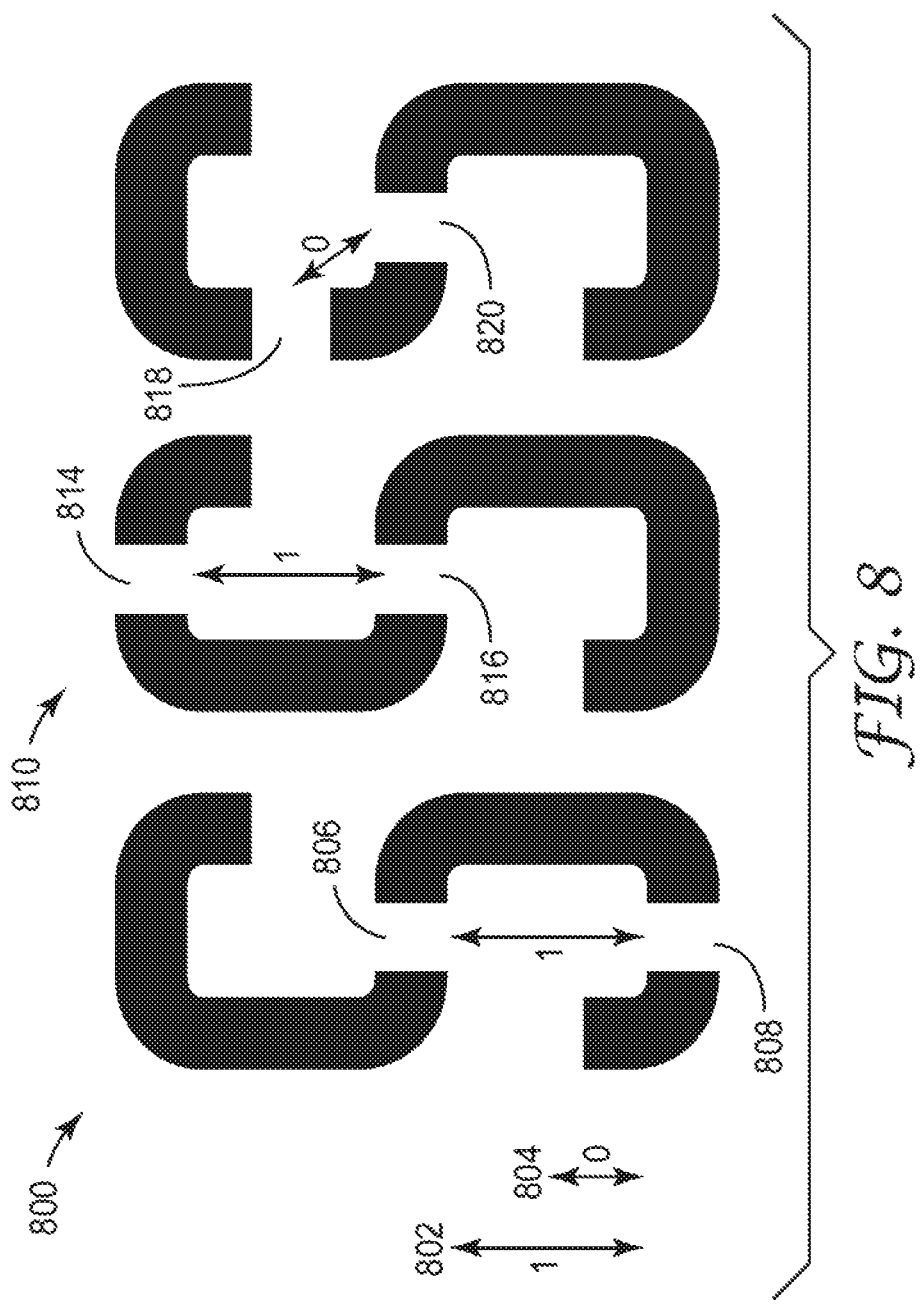
FIG. 8 illustrates encoding regions that represent different values based on distances between the encoding regions, in accordance with techniques of this disclosure.

FIG. 8 illustrates encoding regions that represent different values based on distances between the encoding regions, in accordance with techniques of this disclosure. The techniques of FIG. 8 use relative encoding region placements to represent data. This can be accomplished by locating the encoding regions in the characters based on some predetermined spacing or distance between the gaps. In the example of FIG. 8, distance 802 represents a value of '1' in a binary numbering system and distance 804 represents a value of '2' in a binary numbering system. Symbol 800 in FIG. 8 includes encoding regions 806 and 808. If a value of 1 is to be encoded in symbol 810, then encoding regions 814 and 816 are positioned apart by a distance 802. When the plate is decoded by a computing device, the distance between the gaps is calculated and the associated data value '1' is selected. This allows for some flexibility in gap placement for a given data value which can be used as means for other ends, such as making characters dissimilar. As another example, if a value of '0' is to be encoded in symbol 812, then encoding regions 818 and 820 are positioned apart by a distance 804. In some examples, distance scheme would utilize different spacing for values in different characters, e.g., any N number of distances may be included for N number of corresponding values.

Figure 9B:
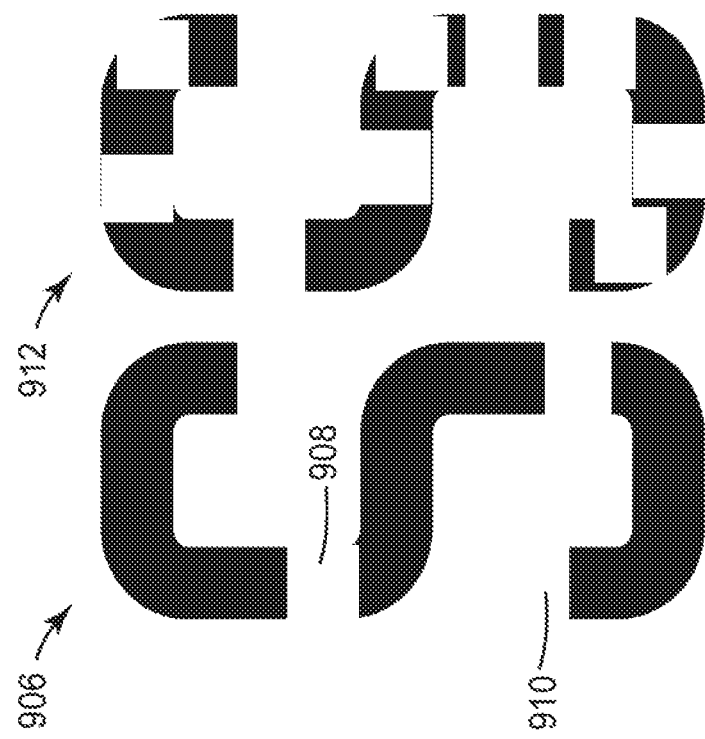
FIG. 9B illustrates encoding values based on the percentage of a symbol that includes visibly-opaque, infrared-transparent or visibly-opaque, infrared-opaque ink, in accordance with techniques of this disclosure.
Figure 9A:
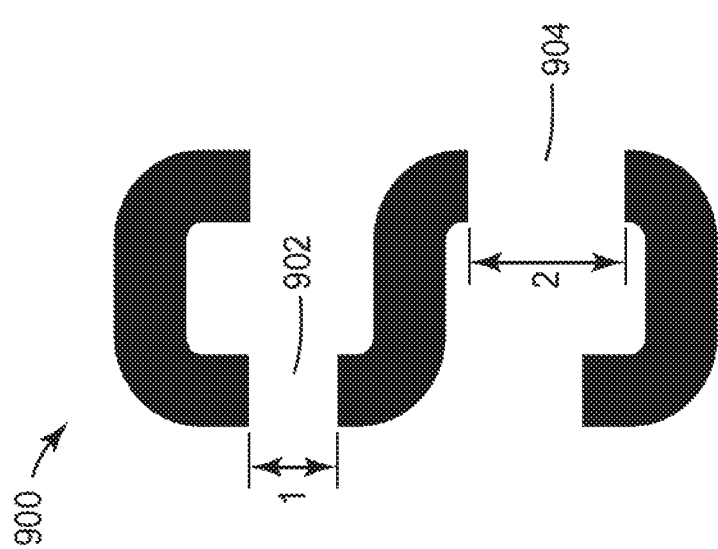
FIG. 9A illustrates encoding regions that represent different values based on sizes of the encoding regions, in accordance with techniques of this disclosure.

FIG. 9A illustrates encoding regions that represent different values based on sizes of the encoding regions, in accordance with techniques of this disclosure. For instance, encoding region size could be used to encode information. Here, FIG. 9 illustrates a symbol 900 with encoding regions 902 and 904. Encoding region 902 is formed as short gap representing a '0', and encoding region 904 is formed as a longer gap (e.g., relatively longer than encoding region 902) representing a '1'. Symbol 900 illustrates the use of two different sizes or gap lengths of the encoding regions, any N number of encoding region sizes or gap lengths could be used.

FIG. 9B illustrates encoding values based on the percentage of a symbol that includes visibly-opaque, infrared-transparent or visibly-opaque, infrared-opaque ink, in accordance with techniques of this disclosure. Symbol 906, for example, illustrates encoding regions 908 and 910 printed with visibly-opaque, infrared-transparent ink. Symbol 912 includes a greater percentage of visibly-opaque, infrared-transparent relative to visibly-opaque, infrared-transparent ink. Therefore, symbol 912 may be decoded as a different value than symbol 900. For instance, when decoding symbol 900, a computing device may determine a particular percentage of symbol 900 that is printed with visibly-opaque, infrared-transparent ink. The computing device may determine a value that corresponds to the percentage. As another example, to encode information each 5% of a symbol printed with visibly-opaque, infrared-transparent ink from 5%-55% could represent a 0-9. In this example, there may be 5% regions worth of space in a symbol based on the region size. Thus a single region represents 5% of the overall space available for printing visibly-opaque, infrared-transparent ink. Symbol 906, for example, shows a character with 10% gapping, and symbol 912 show a symbol with 45% gaps. These two symbols could be decoded and respectively equate to an encoded value of 1 and 7.

Figure 10:
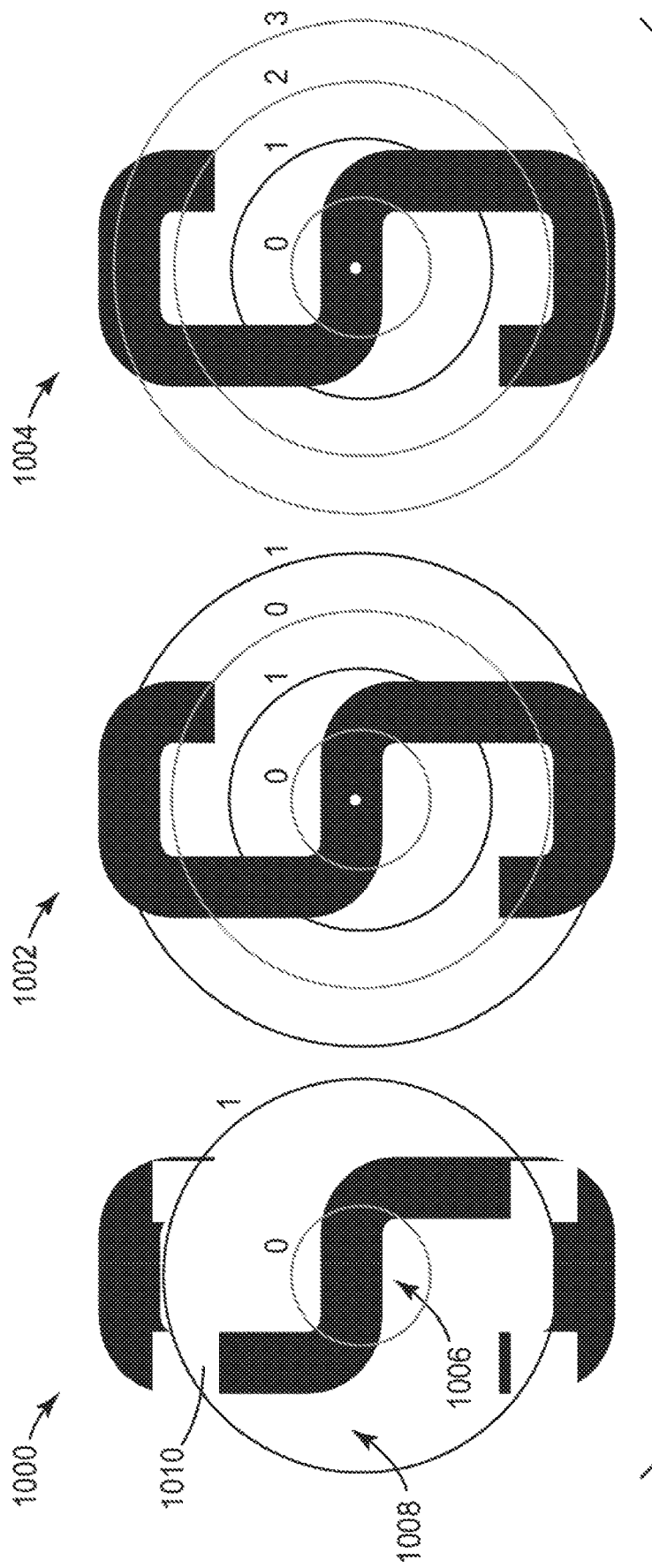
FIG. 10 is conceptual diagram illustrating ratio-metric spacing of encoding regions to encode data, in accordance with techniques of this disclosure.

FIG. 10 is conceptual diagram illustrating ratio-metric spacing of encoding regions to encode data, in accordance with techniques of this disclosure. The techniques may utilize relative spacing between multiple gaps, or ratio-metric spacing of encoding regions, to decode values from symbols. Some techniques may measure a vector from the center (or other starting point) of the symbol to the center (or other ending point) of an encoding region of the symbol. Such techniques may determine a relative measurement on an image, which may error in decoding values by removing an absolute value from the distance determination which could be influenced by variance in cropping, windowing or decoding.

The aforementioned techniques can be visualized as a data circle, as in the example of FIG. 10. In symbol 1000, two rings, 1006 and 1008, are defined to represent values of '0' and '1'. In the example of FIG. 9, if a gap is included in of the rings it can be decoded into the data value. Each ring may be mutually exclusive such that ring 1008 does not include ring 1006 and ring 1006 does not include ring 1008. This allows the flexibility for many gap positions to represent the same data value. This flexibility can be used to optimize some other piece of the system such as maximum character dissimilarity, for example. For instance, symbol 1000 does not include a gap within circle 1006 but includes gaps, such as gap 1010 in circle 1008 (excluding circle 1006).

Symbol 1002 illustrates that this technique could be expanded to have multiple rings that could represent different options for valid 0 or 1 placements in order to add even more flexibility. This could also be utilized to embed more data as shown in symbol 1004 where now each ring represents a different data value. As such, including a gap or encoding region in the symbol within a particular ring would cause a decoder to determine a value associated with the ring. Symbol 1002 illustrates binary encoded values, while symbol 1004 illustrates decimal encoded values.

Figure 11:
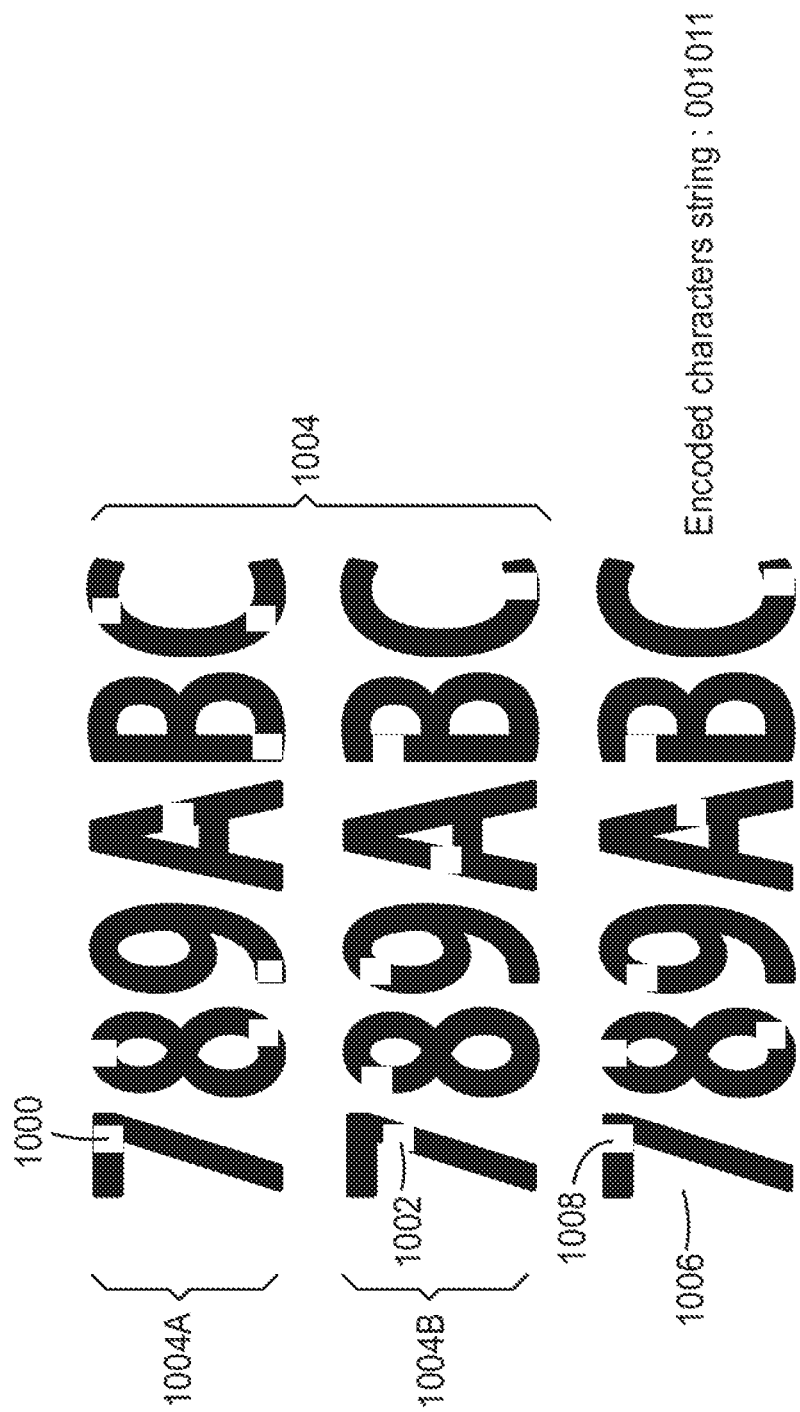
FIG. 11 illustrates a encoding of symbols based on multiple variants of a symbol in a symbol set, in accordance with one or more techniques of this disclosure.

FIG. 11 illustrates a encoding of symbols based on multiple variants of a symbol in a symbol set, in accordance with one or more techniques of this disclosure. In some examples of this disclosure, such as FIG. 1, one or more values encoded in a symbol were based on whether one or more encoding regions were active or inactive. In such examples, each symbol, for example, '7' may have a set of encoding regions at predefined areas and techniques of this disclosure determine whether each encoding region was active or inactive. In FIG. 10, a symbol set 1004 may include multiple symbol variants of the same symbol. Each symbol variant may include one or more active encoding regions at different position, and each symbol variant represents a different value. For instance, decoding data 234 of FIG. 2 may store a symbol set 1004 that includes multiple variants of the '7' character with the following values: $\{7_0: 0\}$, $\{7_1: 1\}$. The value corresponding to a particular variant may be based on where the active encoding region is positioned within a symbol. For instance, active encoding region 1000 is at a first position within the symbol '7' and active encoding region 1002 is in a second, different position within the symbol '7'. As such, when decoding component 120 decodes the active encoding region of the symbol 1006, decoding component 120 determines which variant of symbol '7' is included in the optically active article based on the location of active encoding region 1008. Since the position or location of active encoding region 1008 within symbol 1006 corresponds to $\{7_0: 0\}$, then the highest-ordered bit in the corresponding bitstring 001011 is '0'.

The techniques of FIG. 11 may therefore utilize predetermined gap placements realized through replicated symbols in a given symbol set. For example, two 7's are replicated within a font. Each 7 has a unique set of locations for one or more active encoding regions. In this example, a string of 6 symbols will then contain 6 bits of data. The symbol 7 can be replicated to create dissimilar active encoding region location schemes, and the result will be a printable symbol set that can both aid in OCR performance increases as well as embedding data into that symbol set.

FIG. 11 shows subsets 1004A and 1004B with two variants. The bottom symbol string has encoded data 001011 by being comprised of the characters from subsets 1004A and 1004B. This can be expanded by offering more combinations of data for each character. For example instead of $7_0$ and $7_1$, now it would be possible to have $7_0 \ldots 7_{10}$ or $7_x$, where x is the maximum different allowable gap locations in a character. Each extra iteration of the characters allowed exponentially increases the amount of data stored in a given character string. To increase data density while still maintaining a robust system, one or more techniques of this disclosure could be implemented together. Not only would this provide several methods for encoding information, may also provide for evaluation of several of the rules simultaneously to get a better confidence that all of the rules have been correctly interpreted and the correct data has been decoded.

In some examples, to determine which variant of a symbol corresponds to image data of a symbol in an image, computing device 116 may implement a model for classification such as a neural network. Before use in decoding data from a retroreflective article, computing device 116 may train the neural network based on training data that includes image data of variants of a symbol and respective identifiers of variants of the symbol. In this way, if image data is parameterized and input into the model at a later time, the model may output one or more scores that correspond to probabilities that the image data corresponds to particular variants of the symbol. If computing device 116 receives an image, computing device 116 may select a portion of image data that corresponds to a symbol printed on a retroreflective article. Computing device 116 may parameterize the image data into a feature vector that may be input into the model. For instance, the feature vector may specify any parameterization of the image such as indicating various pixel locations that indicate locations of the symbol, locations that indicate the boundary of the symbol, location of active and/or inactive encoding regions, pixel intensity, curvature, glyphs or other features of the symbol, or any other values that may represent a parameterization of the image data into a feature vector. Computing device 116 may input the feature vector into the model (or classifier) and the model may, based on the prior training, provide a set of one or more scores for different variants of the symbol. Computing device 116 select, for example, the variant of the symbol associated with the highest score from the set of one or more scores. In some examples computing device 116 may perform one or more operations based on the variant, such as determining one or more values associated with the variant and performing further operations.

Figure 12:
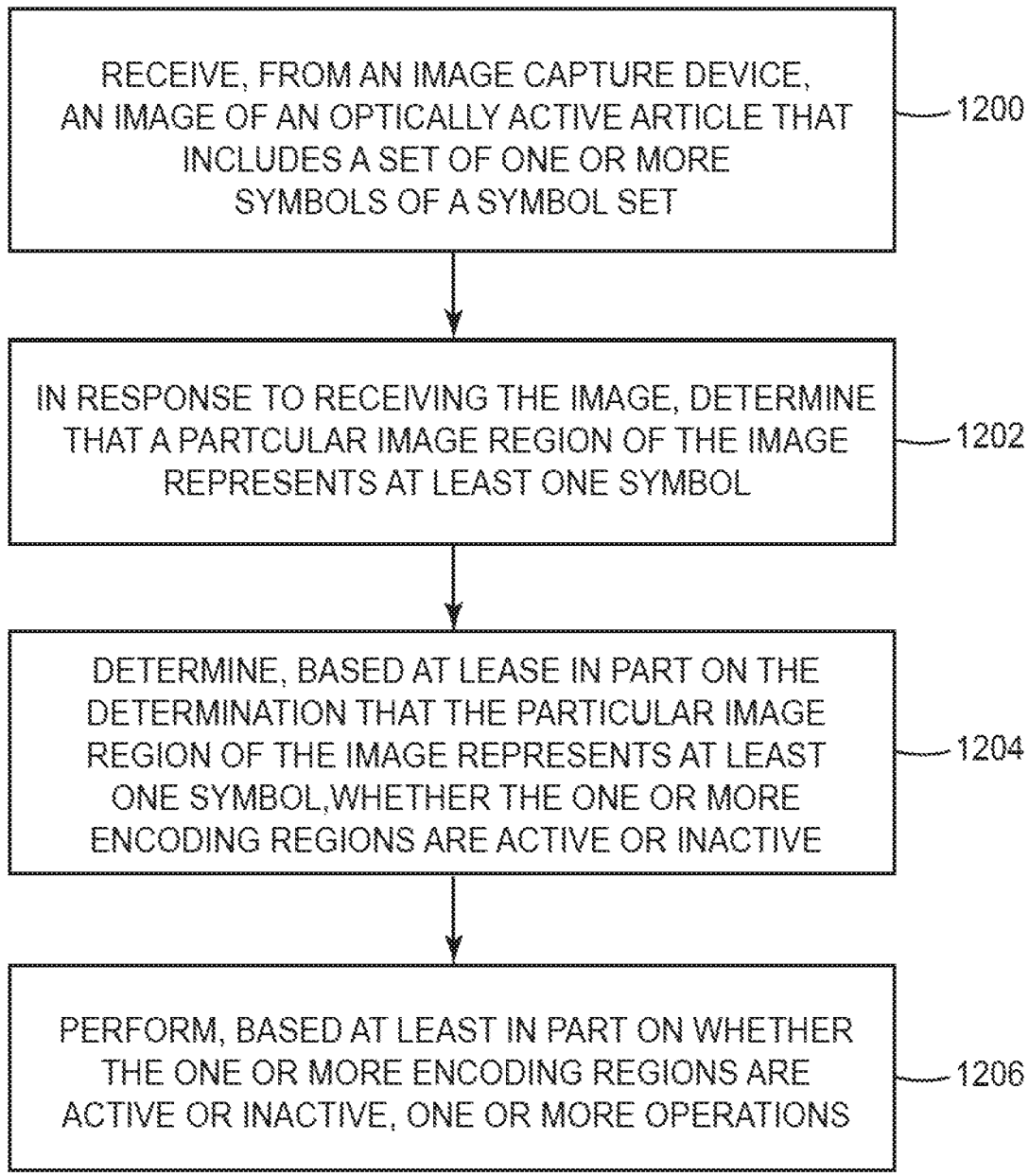
FIG. 12 is a flow diagram illustrating example operations of a computing device configured to perform techniques of this disclosure.

FIG. 12 is a flow diagram illustrating example operations of a computing device configured to perform techniques of this disclosure. For purposes of illustration only, the example operations are described below within the context of computing device 116 of FIG. 1. As shown in FIG. 12, computing device 116 may receive, from an image capture device, an image of an optically active article that includes a set of one or more symbols of a symbol set (1200). The at least one symbol of the set of one or more symbols represented in the image may include a set of one or more encoding regions that are embedded with the symbol. In response to receiving the image, computing device 116 may determine that a particular image region of the image represents the at least one symbol (1202).

Computing device 116 may for one or more encoding regions within the at least one symbol, determine, based at least in part on the determination that the particular image region of the image represents the at least one symbol, whether the one or more encoding regions are active or inactive (1204). In the example of FIG. 12, computing device 116 may perform, based at least in part on whether the one or more encoding regions are active or inactive, one or more operations (1206).

Figure 13:
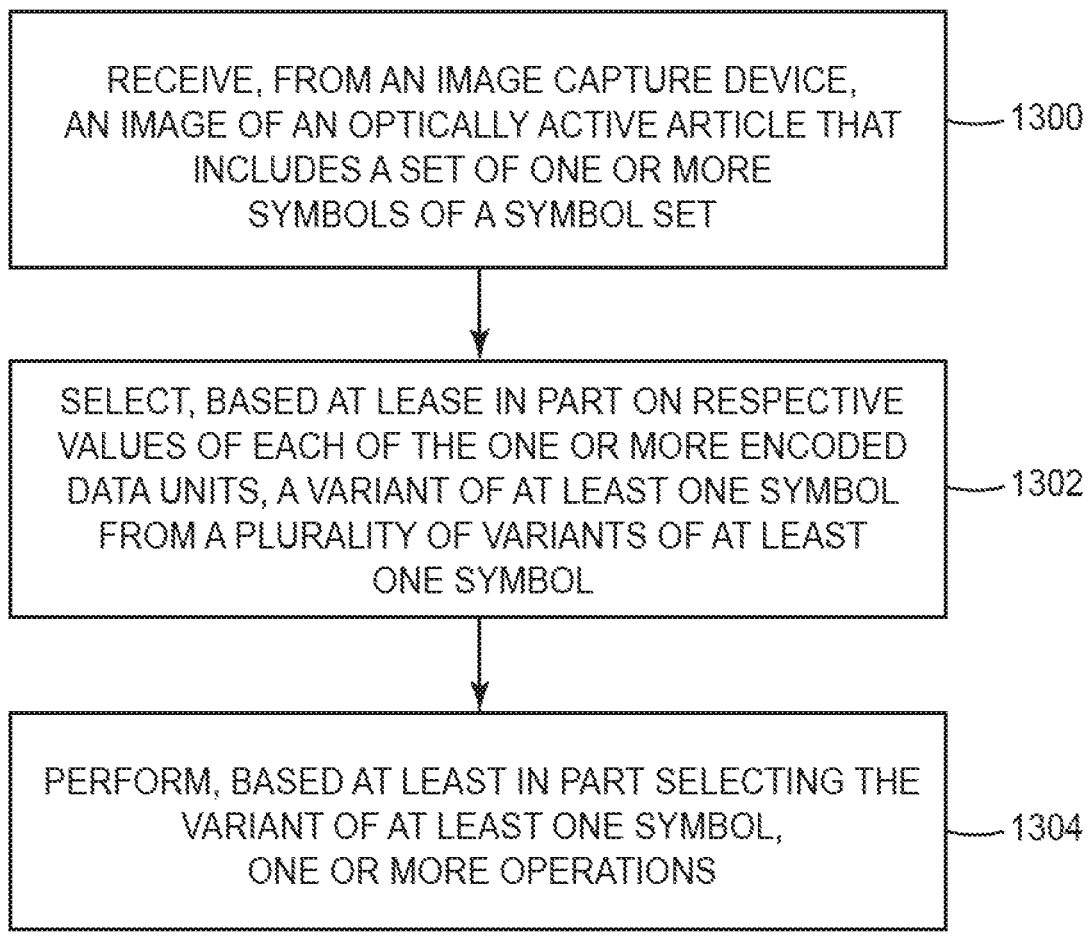
FIG. 13 is a flow diagram illustrating example operations of a computing device configured to perform techniques of this disclosure.

FIG. 13 is a flow diagram illustrating example operations of a computing device configured to perform techniques of this disclosure. For purposes of illustration only, the example operations are described below within the context of computing device 116 of FIG. 1. In the example of FIG. 13, computing device 116 may receive, from an image capture device, an image of an optically active article that includes a set of one or more symbols of a symbol set (1300). Computing device 116 may select, based at least in part on image data representing the symbol and image data representing a plurality of variants of the at least one symbol, a particular variant of the at least one symbol from the plurality of variants of the at least one symbol (1302). Computing device 116 may determine a value associated with the variant of the at least one symbol (1304). Computing device 116 may perform, based at least in part on the value, one or more operations (1306).

In some examples, the term "human-readable information" refers to information that can be read and comprehended by a human without further machine translation. Examples of human-readable information include, but are not limited to, alphanumeric characters, designs, geometric shapes, symbols, and Asian or Arabic language characters. In some examples, human-readable information does not include encoded information that is not comprehended by a human, without further translations of a machine, such as, for example, barcodes. In some embodiments, the human-readable information is made visible or invisible to an appropriate optical detector (e.g., human eye) under certain conditions.

In some examples, the term "machine-readable information" refers to information that is encoded in a form that can be optically imaged by a machine or computer and interpreted by its hardware and software, but not by a human. In some embodiments, the machine-readable information is made visible or invisible to an appropriate optical detector (e.g., camera) under certain conditions.

A retroreflective article chosen for any specific implementation will depend on the desired optical, structural, and durability characteristics. As such, desirable retroreflective articles and materials will vary based on the intended application. Retroreflective articles and materials include reflective and retroreflective substrates. In some examples, the term "retroreflective" as used herein refers to the attribute of reflecting an obliquely incident light ray in a direction antiparallel to its incident direction, or nearly so, such that it returns to the light source or the immediate vicinity thereof. Two known types of retroreflective sheeting are microsphere-based sheeting and cube corner sheeting (often referred to as prismatic sheeting).

Microsphere-based sheeting, often referred to as "beaded" sheeting, employs a multitude of microspheres typically at least partially embedded in a binder layer and having associated specular or diffuse reflecting materials (e.g., pigment particles, metal flakes, vapor coats) to retroreflect incident light. Cube corner retroreflective sheeting, often referred to as "prismatic" sheeting, comprises a body portion typically having a substantially planar front surface and a structured rear surface comprising a plurality of cube corner elements. Each cube corner element comprises three approximately mutually perpendicular optical faces. A seal layer may be applied to the structured surface to keep contaminants away from individual cube corners. Flexible cube corner sheetings can also be incorporated in embodiments or implementations of the present application. Retroreflective sheeting for use in connection with the present application can be, for example, either matte or glossy.

The retroreflective articles described herein may be configured to include sheeting that can be applied to a given object or substrate. The articles may be optically single-sided. That is, one side (designated the front side) is generally adapted to both receive incident light from a source and emit reflected or retroreflected light toward a detector (such as the eye of an observer), and the other side (designated the rear side) is generally adapted for application to an object such as by an adhesive layer. The front side faces the light source as well as the detector.

In some examples, light in driving and ALPR environments can be divided into the following spectral regions: visible light in the region between about 350 and about 700 nm, and infrared light in the region between about 700 and about 1100 nm. Typical cameras have sensitivity that includes both of these ranges, although the sensitivity of a standard camera system decreases significantly for wavelengths longer than 1100 nm. Various light emitting diodes (LEDs) can emit light over this entire wavelength range, and typically most LEDs are characterized by a central wavelength and a narrow distribution around that wavelength. For example, in a system including LEDs emitting light rays having a wavelength of 830 nm+/−20 nm, a suitably equipped camera could detect a license plate in the near infrared spectrum with light not visible to the driver of the vehicle. Thus the driver would not see the "strobe" light effect of the LEDs and would not be distracted by them.

In some examples, cameras and lights are typically mounted to view the license plates at some angle to the direction of vehicle motion. Exemplary mounting locations include positions above the traffic flow or from the side of the roadway. Images may be collected at an angle of 20 degrees to 45 degrees from normal incidence (head-on) to the license plate. A detector which is sensitive to infrared or ultraviolet light as appropriate may be used to detect retroreflected light outside of the visible spectrum. Exemplary detectors include cameras include those sold by 3M Company of St. Paul, Minn., including but not limited to the P372.

The retroreflective articles described herein can be used to improve the capture efficiency of these license plate detection or recognition systems. ALPR capture can be described as the process of correctly locating and identifying license plate data, including, but not limited to, indicia, plate type, and plate origin. Applications for these automated systems include, but are not limited to, electronic toll systems, red light running systems, speed enforcement systems, vehicle tracking systems, trip timing systems, automated identification and alerting systems, and vehicle access control systems.

In some examples, retroreflective articles of the present disclosure may also be used in signage. The term "signage" as used herein refers to an article that conveys information, usually by means of alphanumeric characters, symbols, graphics, or other indicia. Specific signage examples include, but are not limited to, signage used for traffic control purposes, street signs, conspicuity sheeting, window stickers, identification materials (e.g., licenses), and vehicle license plates. In some examples, it may be beneficial to use the articles of the present application to employ the desirable property of viewing machine-readable barcodes without changing the appearance of a signage under visible light. Such retroreflective articles would enable the reading of signage specific information meant for general consumption while avoiding driver or sign reader distraction by and/or unwanted detection of "covert" markings, such as variable information of a barcode. Such a development facilitates invisible marking of and/or signaling by articles for security purposes, identification, and inventory control. For example, the covert markings could contain signage-specific information such as, for example, signage material lot number, installation date, reorder information, or product life expectancy.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A method comprising:
receiving, by a computing device and from an image capture device, an image of an optically active article that includes a set of one or more symbols of a symbol set, wherein at least one symbol of the set of one or more symbols represented in the image comprises a set of one or more encoding regions that are embedded with the symbol;

in response to receiving the image, determining, by the computing device, that a particular image region of the image represents the at least one symbol;

for one or more encoding regions within the at least one symbol, determining, by the computing device and based at least in part on the determination that the particular image region of the image represents the at least one symbol, whether the one or more encoding regions are active or inactive; and performing, by the computing device and based at least in part on whether the one or more encoding regions are active or inactive, one or more operations, wherein determining whether the one or more encoding regions are active or inactive comprises:

determining, by the computing device and based on the particular image region of the image representing the at least one symbol, a set of pre-defined locations for the encoding regions within the symbol;

for each respective location of the predefined locations, determining whether a respective encoding region that corresponds to the respective pre-defined location is active or inactive; and determining one or more values based on whether the one or more encoding regions are active or inactive.

2. The method of claim 1, wherein a first encoding region that reflects light above a threshold light intensity is active and a second encoding region that does not reflect the light above the threshold light intensity is inactive.

3. The method of claim 1, wherein a first encoding region that reflects light above a threshold light intensity is inactive and a second encoding region that does not reflect the light above the threshold light intensity is active.

4. The method of claim 1, wherein the one or more encoding regions are printed with visibly-opaque, infrared-transparent ink on a retroreflective surface of the optically active article and a remaining portion of the at least one symbol that excludes the one or more encoding regions are printed with visibly-opaque, infrared-opaque ink.

5. The method of claim 1, wherein a first set of pixel values, which represent one or more active encoding regions of the one or more encoding regions, are within a first range of pixel values, wherein a second set of pixel values, which represent a remaining portion of the at least one symbol that excludes the one or more active encoding regions, are within a second range of pixel values that are different from the first range of pixel values.

6. The method of claim 5, wherein the image is a first image and wherein the first image of the optically active article is captured in a first spectral range within the near-infrared spectrum, wherein a second image of the optically active article is captured in a second spectral range within the visible spectrum, wherein a third set of pixel values that represent the at least one symbol in the second image are within the second range of pixel values, and wherein a first proportion of the third set of pixel values that represent the at least one symbol is greater than a second proportion of the second set of pixel values that represent the at least one symbol.

7. The method of claim 1, further comprising:

determining, by the computing device, a location of an active encoding region of the one or more encoding regions;

determining, by the computing device, a value based at least in part on the location of the active encoding region; and wherein performing one or more operations comprises performing the one or more operations based at least in part on the value.

8. The method of claim 1, further comprising:

determining, by the computing device, a set of one or more pixel values of an active encoding region of the one or more encoding regions;

determining, by the computing device, that the set of one or more pixel values value within a particular range of a plurality of ranges of pixel values;

determining, by the computing device, a value based at least in part on the particular range; and wherein performing one or more operations comprises performing the one or more operations based at least in part on the value.

9. The method of claim 1, further comprising:

determining, by the computing device, a distance between at least two encoding regions of the symbol;

determining, by the computing device, a value based at least in part on the distance; and wherein performing one or more operations comprises performing the one or more operations based at least in part on the value.

10. The method of claim 1, further comprising:

determining, by the computing device, a proportion of the at least one symbol that is comprised of one or more encoding regions;

determining, by the computing device, a value based at least in part on the proportion; and wherein performing one or more operations comprises performing the one or more operations based at least in part on the value.

11. The method of claim 1, further comprising:

determining, by the computing device, a size of an active encoding region of the one or more encoding regions;

determining, by the computing device, a value based at least in part on the size; and wherein performing one or more operations comprises performing the one or more operations based at least in part on the value.

12. The method of claim 1, further comprising:

determining, by the computing device, a radial distance between a reference location and a location of an active encoding region of the one or more encoding regions;

determining, by the computing device, a value based at least in part on the radial distance; and wherein performing one or more operations comprises performing the one or more operations based at least in part on the value.

13. The method of claim 1, further comprising:

determining, by the computing device, one or more values of one or more encoding data units that represent an error-detecting code;

performing, by the computing device, a check based on the error-detecting code to determine whether the error-detecting code is valid; and wherein performing one or more operations comprises performing the one or more operations based at least in part whether the error-detecting code is valid.

14. The method of claim 1, further comprising:

wherein each active encoding region of the one or more encoding regions represents a first value, wherein each inactive encoding region of the one or more encoding regions represents a second value, and generating, by the computing device, a bitstring with one or more instances of the first value and the second value.

15. A method comprising:

receiving, by a computing device and from an image capture device, an image of an optically active article that includes a set of one or more symbols of a symbol set, wherein at least one symbol of the set of one or more symbols represented in the image comprises a set of one or more active encoding regions that are embedded with the symbol;

selecting, based at least in part on image data representing the symbol and image data representing a plurality of known variants of the at least one symbol, a particular variant of the at least one symbol from the plurality of known variants of the at least one symbol;

determining a value associated with the variant of the at least one symbol; and performing, by the computing device and based at least in part on the value, one or more operations.

16. The method of claim 15, further comprising:

parameterizing the image data representing the symbol into a feature vector;

inputting the feature vector into a classifier; and wherein selecting the particular variant of the at least one symbol comprises determining, based at least in part on classification by the classifier, the particular variant.

17. The method of claim 15,
wherein each variant of the plurality of known variants represents the same at least one symbol, and
wherein each variant of the plurality of known variants includes a different arrangement of active encoding regions.

18. The method of claim 15, wherein the set of one or more active encoding regions reflect light above a threshold light intensity.

19. The method of claim 15, wherein the set of one or more active encoding regions do not reflect light above a threshold light intensity.

20. The method of claim 15,
wherein a first set of pixel values, which represent the one or more active encoding regions, are within a first range of pixel values,
wherein a second set of pixel values, which represent a remaining portion of the at least one symbol that excludes the one or more active encoding regions, are within a second range of pixel values that are different from the first range of pixel values.

* * * * *